(12) United States Patent
Pederson et al.

(10) Patent No.: US 8,459,302 B2
(45) Date of Patent: Jun. 11, 2013

(54) FLUID-DIRECTING MULTIPORT ROTARY VALVE

(75) Inventors: Brian Keith Pederson, Morton, IL (US); Brad Kevin Ahlgren, Apollo Beach, FL (US)

(73) Assignee: Gulf Sea Ventures LLC, Apollo Beach, FL (US)

( * ) Notice: Subject to any disclaimer, the term of this patent is extended or adjusted under 35 U.S.C. 154(b) by 393 days.

(21) Appl. No.: 12/807,864

(22) Filed: Sep. 15, 2010

(65) Prior Publication Data

US 2011/0067770 A1    Mar. 24, 2011

Related U.S. Application Data

(60) Provisional application No. 61/277,047, filed on Sep. 21, 2009.

(51) Int. Cl.
*F16K 11/074* (2006.01)

(52) U.S. Cl.
USPC .............. 137/625.15; 137/625.46; 210/278; 210/425

(58) Field of Classification Search
USPC .......... 137/625.11, 625.15, 625.46; 210/278, 210/424–426
See application file for complete search history.

(56) References Cited

U.S. PATENT DOCUMENTS

| 3,223,123 | A | * | 12/1965 | Young | 137/625.46 |
| 3,451,428 | A | * | 6/1969 | Pruett | 137/625.46 |
| 3,460,574 | A | * | 8/1969 | Risher | 137/625.66 |
| 4,632,149 | A |   | 12/1986 | Oroskar et al. | |
| 4,705,627 | A | * | 11/1987 | Miwa et al. | 210/264 |
| 6,672,336 | B2 | * | 1/2004 | Nichols | 137/625.46 |
| 6,719,001 | B2 | * | 4/2004 | Ahlgren et al. | 137/312 |

* cited by examiner

*Primary Examiner* — John Rivell
*Assistant Examiner* — Ian Paquette
(74) *Attorney, Agent, or Firm* — William B. Ritchie

(57) ABSTRACT

A multiport rotary valve apparatus for directing fluid streams which has two circular stationary heads and two circular rotating heads. The first stationary head has at least two and preferably more primary ports for connection with fluid streams and a corresponding number of secondary ports for connection to fluid-solid contacting chambers. The second stationary head has the same number of primary ports as the first stationary head (at least two and preferably more) for connection with the fluid streams and the same number of secondary ports for a second connection to the fluid-solid contacting chambers. Each stationary head includes internal conduits for the connection of the primary and secondary ports to a rotating head.

7 Claims, 15 Drawing Sheets

Fig. 1

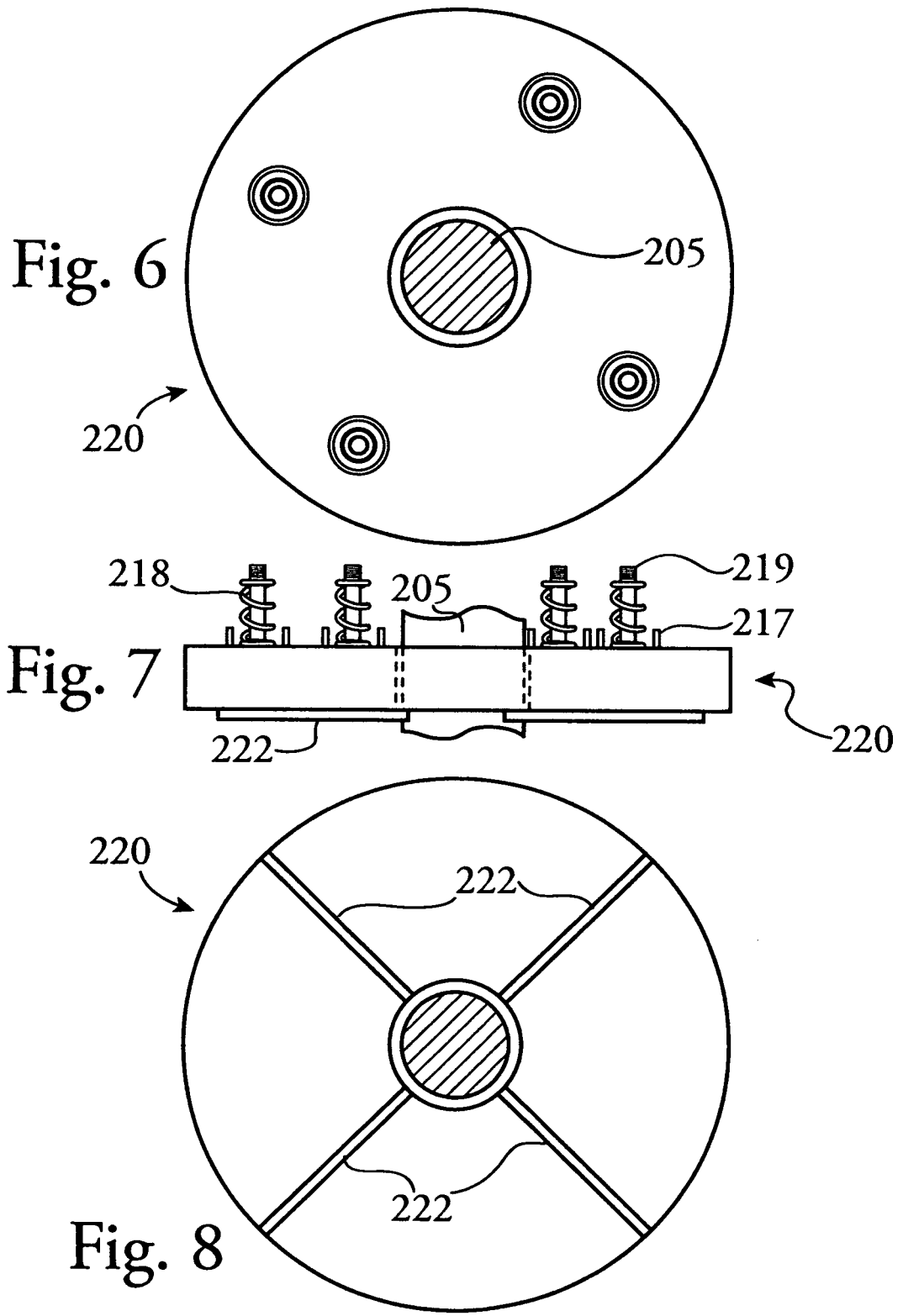

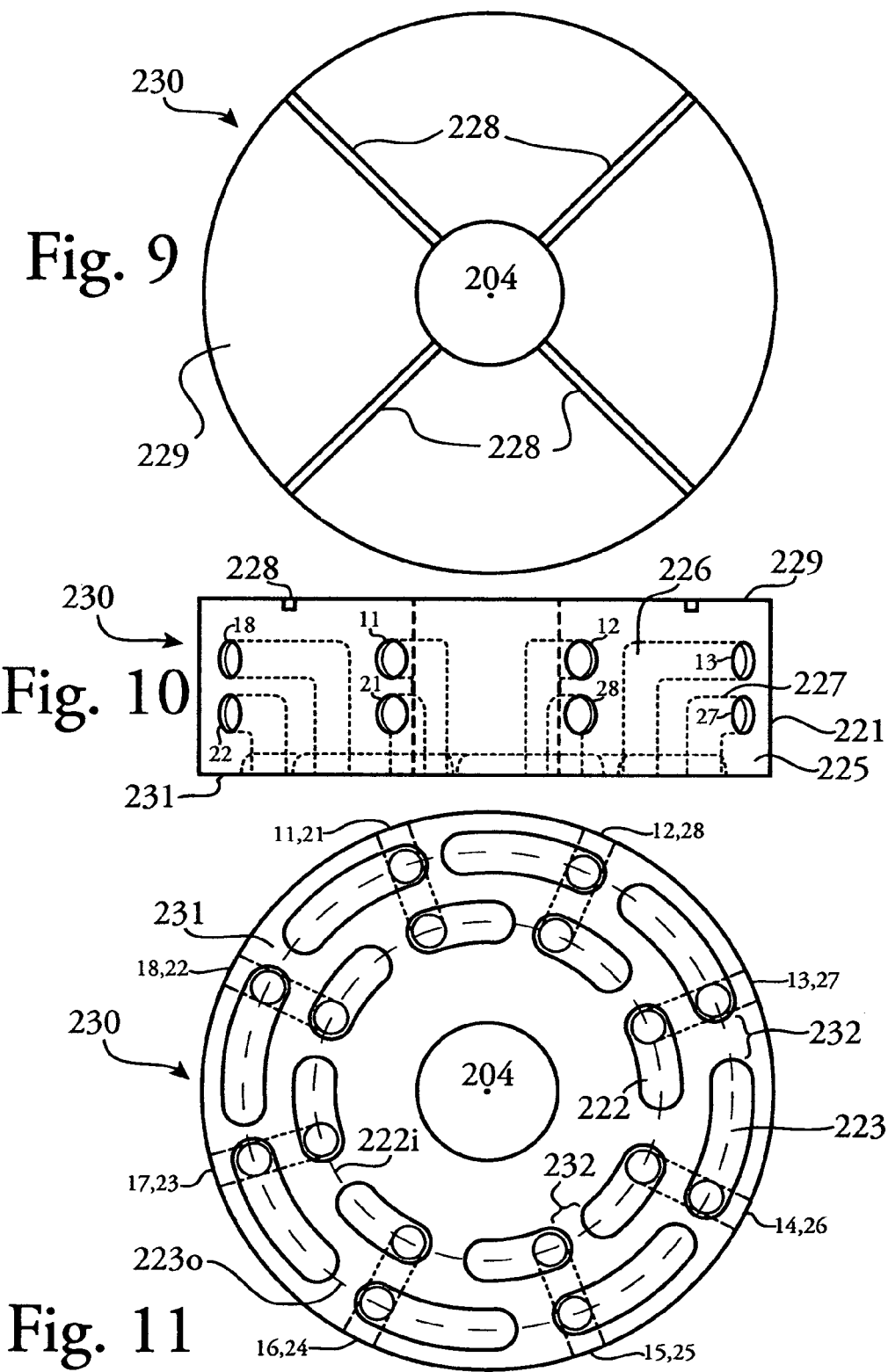

US 8,459,302 B2

FLUID-DIRECTING MULTIPORT ROTARY VALVE

This application claims benefit under Title 35 USC, §119 (e) of U.S. provisional patent application Ser. No. 61/277,047 filed Sep. 21, 2009.

FIELD OF THE INVENTION

This invention relates to valves, in particular a simplified rotary valve for simultaneously directing a plurality of fluid streams sequentially into and out of a plurality of fluid-solid contacting chambers employed for purifying, treating and separating fluids.

BACKGROUND OF THE INVENTION

Fluid-solid contacting systems have evolved over the years from simple batch operations to more advanced systems that attempt to simulate counter-current continuous flow operations sometimes termed "simulated moving beds" (SMB) in chromatographic separations or "continuous contactors" in ion exchange or adsorption type processes. These SMB systems or continuous contactors only simulate movement of a solid counter current to a fluid since they do not truly and continuously move the solid through the fluid. In essence, any of these systems can be generally termed "Simulated Moving Beds". This simulation is typically achieved by stepping or indexing a plurality of smaller batch fluid-solid contacting chambers through the various fluid streams by employing multiple numbers of individual valves, single rotary valves, multiple chambers sometimes arranged or combined to simplify the piping, and in some cases rotating tables for the chambers. These systems offer improved process efficiencies over simple batch systems and approach the ideal of truly continuous counter current operation, yet each of the current systems suffer from some deficiency like relatively large capital expense, mechanical complexity, severe process limitation and inflexibility.

An early SMB system design shown in U.S. Pat. No. 3,192,954 to Gerhold featured a single multi compartment tank and a single multiport valve employed in the separation of various non-ionic hydrocarbons. The cost and complexity of the multiport valve and multi compartment tank hampered its acceptance in many applications and spawned simpler designs.

Achieving the same process separation by a less costly manner, many current SMB systems used in chromatography applications employ multiple fluid-solid contacting chambers with multiple valves. See, for example, U.S. Pat. No. 5,705,061 to Moran or U.S. Pat. No. 6,409,922 to Kaneko, which disclose a plurality of valves and a plurality of inlet and outlet pipes from a plurality of chambers. A programmable controller is used to sequence the valves and thereby the flows to the chambers to effect the purification or separation.

To address the sheer number of valves in these designs, a relatively simple multiport rotary valve design was put forth by Ahlgren in U.S. Pat. No. 6,719,001, which was similar in function to earlier U.S. Pat. No. 3,192,954 and suitable for relatively simple chromatographic applications. However, as process conditions become more complex as they do in ion exchange and adsorption type processes, the number of chambers, pipes and programming quickly becomes unmanageable, even with this simplified valve disclosed in the '001 patent.

Therefore, with either individual valves or multiport rotary valves, these SMB system designs are typically used in simple chromatographic separations and not in more complex processes like ion exchange. Generally, these designs are simple, but lack process flexibility.

To address the issue of limited applicability of the aforementioned systems, various "continuous contactor" equipment designs have been put forth to address the complexity of the piping that ensues in more complex purification and separation applications. One widely employed design (See, Rossiter, U.S. Pat. No. 5,676,826) is a single distribution valve for multiple inlets and outlets communicating with fluid-solid contacting chambers mounted on a rotating table. The single distribution valve has a rotating head that moves or indexes in concert with a plurality of fluid-solid contacting chambers on the turntable. As the fluid distribution rotating head and turntable move, the fluid-solid contacting chambers sequentially come into communication with each stationary head inlet and outlet fluid stream. The step time or dwell time of the chambers in contact with the particular fluid streams can be adjusted as dictated by the process. This design affords process flexibility and elegance since the stationary piping separate from the distribution valve determines the process and not the distribution valve, but the design oftentimes suffers from cost and mechanical complexities due to moving extreme weights and hazardous chemicals in chambers on a turntable.

Two more recent designs (U.S. Pat. No. 6,802,970 issued to Rochette and U.S. Patent Application No. 2006/0124177 A1 applied for by Jensen) build upon earlier ideas (U.S. Pat. No. 2,706,532 issued to Ringo, U.S. Pat. No. 4,625,763 issued to Schick and U.S. Pat. No. 5,478,475 issued to Morita) and address the real and perceived mechanical rotation issues by removing the turntable and replacing it with a more complex rotary valve. Both designs accomplish this feat by employing a valve apparatus that has both stationary and rotating parts, which include a number of circular channels and conduits for each inlet and outlet process stream. These circular channels in turn communicate through a rotatable part with the appropriate ports connected to stationary fluid-solid contacting chambers. As the rotating parts are moved or indexed, the next chamber in the sequence is brought into communication with the previous fluid stream. All of the other inlet and outlet fluid streams also follow along in sequence thereby effecting the simulated movement of chambers containing the solid through the fluids. These designs sacrifice process elegance and flexibility but do eliminate the physical movement of the solid fluid chambers on a turntable. They introduce severe deficiency of design in that the process configuration is set by the rotating and stationary part designs and not easily changed at reasonable cost. Consequently, they lack flexibility in application to other processes. For example, an apparatus of one of these designs used in water softening ion exchange could not easily be used for sugar syrup ion exchange or chromatography without major change to the apparatus. These designs also suffer from severe sealing challenges due to the complex nature of sealing a variety of ports, circular channels and faces on various planes and through a wide variety of temperature ranges. As these parts age, the sealing issues can also become more pronounced and again increase maintenance and cost.

Therefore, there is not found in the prior art a rotary valve for simultaneously directing a plurality of fluid streams into or out of fluid-solid contacting chambers suitable for a wide range of processes without one or more of the deficiencies referenced above such as large and potentially dangerous moving turntables, multiple individual valves, complex construction, difficult sealing designs, complex surfaces and limited process flexibility. None of the valves in the prior art recognize that configuration of the stationary connections to the rotary distribution valve are key to complete process flexibility but at the same time eliminating the rotation of chambers on a turntable.

SUMMARY OF THE INVENTION

The present invention provides a combined multi-port rotary valve for simultaneously directing a plurality of fluid streams sequentially into or out of a plurality of stationary fluid-solid contacting chambers employed for purifying and separating multi-component fluids while eliminating many of the disadvantages in the art. Less complex processes like SMB chromatography may employ one single multi port valve, but in practice, it is preferred to have two multiport rotary valves joined into one combined multiport rotary valve apparatus. While two valves can be configured physically independent of each other, they must rotate or index in synchronization with one another, which makes it preferable to integrate them together as a combined multiport rotary valve. It is also preferred to have more than two contacting chambers, for example.

It is an aspect of the present invention to provide a combined multiport rotary valve that eliminates rotating fluid-solid chambers on a turntable, which addresses the mechanical complexity, layout limitations and safety issues of a turntable in the prior art.

It is another aspect of the present invention to provide a combined multiport rotary valve that has the same configuration design in any process and many symmetrical components which allows for simplified inventory of multiport rotary valve parts and addresses the disadvantage of the process specific design of prior art.

It is still another aspect of the present invention to provide a combined multiport rotary valve with only two planar sealing surfaces, which eliminates the complex circular channel and annular sealing technology employed in prior art.

Another aspect of the present invention is to provide a simplified and accessible design that allows for visual inspection of a majority of the parts.

BRIEF DESCRIPTION OF THE DRAWINGS

FIG. 1 is a schematic drawing of a combined multiport rotary valve being used as a continuous contacting apparatus for fluid purification.

FIG. 6 is a top plan view of the pressure plate 220 of FIG. 3.

FIG. 7 is a side view of the pressure plate 220 of FIG. 3.

FIG. 8 is a bottom plan view of the pressure plate 220 of FIG. 3.

FIG. 9 is a top plan view of the top stationary head 230 of FIG. 3

FIG. 10 is a side view of the top stationary head 230 of FIG. 3

FIG. 11 is a bottom plan view of the top stationary head 230 of FIG. 3

DETAILED DESCRIPTION OF THE PREFERRED EMBODIMENT

Figure 1:
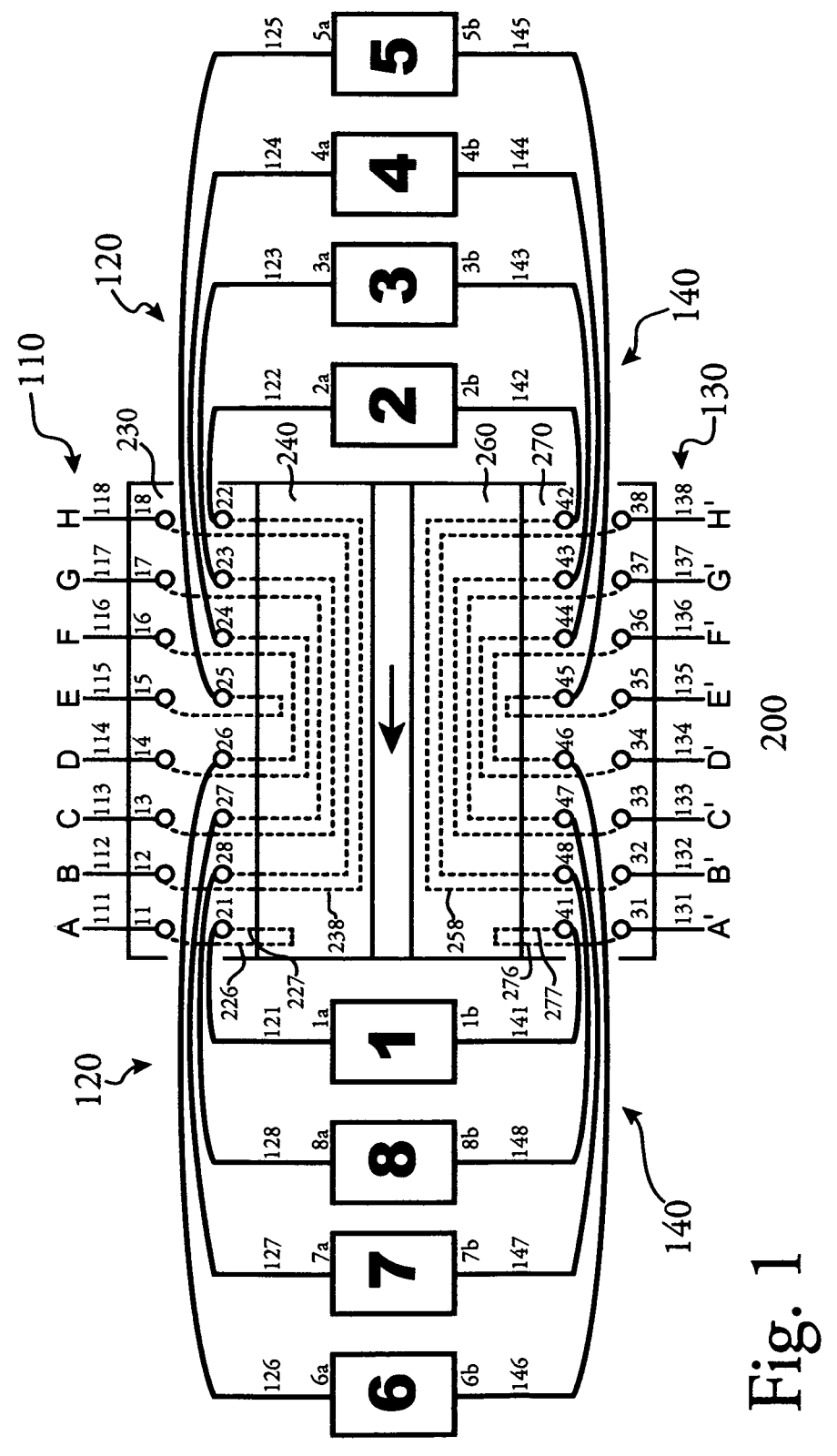
Figure 2:
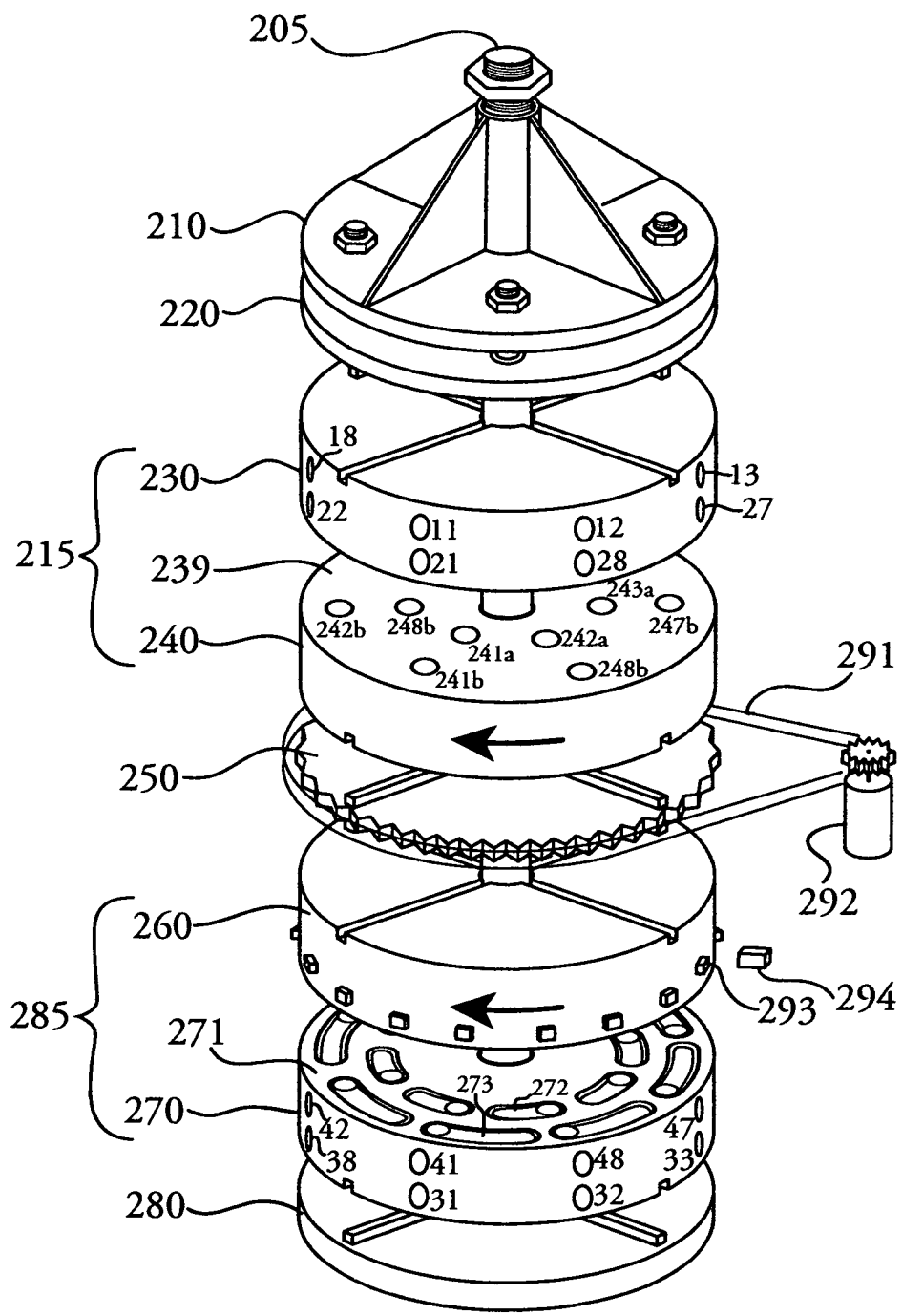
FIG. 2 is an exploded perspective of a combined multiport rotary valve in accordance with invention.

Referring to FIG. 1, invention 200 is shown in a schematic with a plurality of fluid contacting chambers 1-8. Chambers 1-8 have a first connection 1a-8a that connect by conduits 120 to multiport valve 200 at ports labeled 21-28. The same chambers 1-8 have a second connection 1b-8b that connect by conduits 140 to multiport valve 200 at ports labeled 41-48. Process streams A-H connect by conduits 110 with multiport valve 200 through ports 11-18 and are in connection with chamber connections 21-28 by internal conduits 226, 238 and 227. Process streams A'-H' connect by conduits 130 to the same multiport valve 200 through ports 31-38 and are in connection with chamber connections 41-48 by internal conduits 276, 258 and 277. For the sake of clarity, labels 226 and 227 refer to all similar internal conduits on stationary head 230 while labels 276 and 277 refer to all similar internal conduits on stationary head 270. Labels 238 and 258 refer to all internal transverse channels in rotating heads 240 and 260 respectively and are rotatable in relation to the process connections 11-18, 31-38 and the chamber connections 21-28, 41-48 thereby allowing a simulated movement of chambers 1-8 to the process streams A-H and A'-H'. Note that the number of contacting chambers is merely an example and the actual number of chambers utilized can be of any number greater than two. Correspondingly, the number of inlets, outlets, conduits, ports and so on would be adjusted accordingly.

The present embodiment of the combined multiport rotary valve 200 of the invention is shown and described in conjunction with fluid solid contacting chambers containing a treatment media wherein a contaminated feed stream is continually treated by the media while at the same time the exhausted media is continually regenerated and put back into service. Using water softening ion exchange as an example, each chamber will contain the same typical strong acid cation resin. The four required steps in a water softening application are described as "Service", "Backwash", "Chemical" and "Rinse". "Service" is the treatment of the incoming water with the cation resin until the resin capacity is exhausted, "Backwash" is the removal of particulates from the resin, "Chemical" is the process of reverse ion exchange where salt is used to put the resin back into a usable form, "Rinse" is the process of removing excess salt from and around the resin prior to placing it back into "Service". In a batch operation like a domestic water softener these four steps are preformed sequentially after the batch system is taken out of operation. In a continuous system like the one described here all four steps occur at the same time since at least one chamber is in each step at each instant, allowing for continuous operation. In the water softening example with this invention, streams A-E will be the incoming contaminated or hard water and are in "Service" and are being treated by the resin in chambers 1-5. Water for treatment would enter stationary head 230 of multiport rotary valve 200 by conduit 111-115 at port connections 11-15. Streams A-E proceed by internal conduits 226 to rotary head 240 and are redirected by internal transverse conduits 238 back to stationary head 230 and by internal conduits 227 to chamber connections 21-25. Streams A-E then proceed by conduits 121-125 to enter chambers 1-5 through connections 1a-5a. Streams A-E contact the strong acid cation resin contained in chambers 1-5 and exchange hard ions in solution like calcium and magnesium for the soft ion sodium on the resin. The calcium and magnesium are captured by the strong acid cation resin while an equivalent number of sodium ions are exchanged into the streams. Hard water streams A-E now become soft or treated water streams A'-E' and exit chambers 1-5 through connections 1b-5b and connect by conduits 141-145 to the stationary head 270 at ports 41-45. Streams A'-E' proceed by internal conduits 277 to rotating head 260 and are redirected by internal transverse conduits 258 back to the stationary head 270. Streams A'-E' now proceed by internal conduits 276 and exit at ports 31-35 to conduits 131-135 as treated soft water. Continuing with the softening example the other streams in total are generally called "regeneration" and include streams F, G, H, F', G' and H'. The steps will be described in reverse order since the resin in the chambers will move counter-currently to the streams. Stream H' by conduit 138 directs untreated water into multiport valve 200 at port 38 in stationary head 270. Stream H' proceeds by an internal conduit 276 to rotating head 260 and is redirected by an internal transverse conduit 258 back to stationary head 270 and proceeds by an internal conduit 277 to exit at port 48. Stream H' proceeds by conduit 148 to chamber 8 through connection 8b. Stream H' proceeds in an upward direction through the resin contained in chamber 8 and serves as a backwash stream to remove any entrained particulates or broken resin beads and proceeds out of chamber 8 through connection 8a as stream H. Stream H proceeds by conduit 128 to stationary head 230 of multiport valve 200 through connection 28 and proceeds by an internal conduit 227 to rotary head 240 and is redirected by an internal transverse conduit 238 back to stationary head 230. Stream H proceeds by an internal conduit 226 to exit multiport valve 200 through port 18 where Backwash waste stream H is directed to waste by conduit 118. Stream G is the "Chemical" step and directs a salt (NaCl) solution by conduit 117 into multiport valve 200 through port 17 in stationary head 230. Stream G proceeds by an internal conduit 226 to rotating head 240 and is redirected by an internal transverse conduit 238 back to stationary head 230 and proceeds by an internal conduit 227 to exit through port 27. Salt stream G then proceeds by conduit 127 to chamber 7 through connection 7a. Stream G proceeds in a downward direction through the resin contained in chamber 7 and serves as a regeneration stream to exchange soft monovalent ions (Na+) in solution for hard divalent ions (Ca++ and Mg++) captured on the resin. The strong acid cation resin generally prefers divalent ions over monovalent ions in low concentrations as in the untreated water. However, a high concentration of monovalent sodium ions in the salt stream will overwhelm and displace the divalent ions and put the resin back in the monovalent sodium form and is called regeneration. Stream G proceeds out of chamber 7 through connection 7b as stream G'. Stream G' proceeds by conduit 147 to stationary head 270 of multiport valve 200 through port 47 and proceeds by an internal conduit 277 to rotary head 260 and is redirected by an internal transverse conduit 258 back to stationary head 270. Stream G' then proceeds by an internal conduit 276 to exit multiport valve at port 37 as regeneration waste stream G' which is directed to waste by conduit 137. Stream F is water used for rinse and proceeds by conduit 116 to enter multiport valve 200 through port 16 in stationary head 230 and proceeds by an internal conduit 226 to rotating head 240 and is redirected by an internal transverse conduit 238 back to stationary head 230. Stream F then proceeds by an internal conduit 227 to exit through port 26 and proceed by conduit 126 to chamber 6 through connection 6a. Stream F proceeds in a downward direction through the resin contained in chamber 6 and serves as a rinse stream to displace the excess NaCl in the chamber. Stream F proceeds out of chamber 6 through connection 6b as stream F' and connects by conduit 146 to stationary head 270 of multiport valve 200 at port 46. Stream F proceeds by an internal conduit 277 to rotary head 260 and is redirected by an internal transverse conduit 258 back to stationary head 270 and proceeds by an internal conduit 276 to exit the multiport valve through port 36 as rinse waste stream F', which is directed to waste by conduit 136.

The rotating heads 240 and 260 of multiport rotary valve 200 remain in the same position and maintain the current flow path by internal transverse conduits 238 and 258 until an end point time when substantially all monovalent sodium ions on the strong acid cation resin in chamber 1 have been exchanged for divalent ions calcium and magnesium in Stream A. This end point time can be determined empirically by sensor, or estimated by time based on resin capacity, feed service flow rate and ion load in the feed. When the end point is reached and capacity for divalent ions in chamber 1 is exhausted, the rotating heads 240 and 260 are indexed clockwise, looking from top down, one position. This index essentially moves by internal transverse conduits 238 and 258, chamber 1 from "Service" and places it into the first regeneration step called "Backwash" which chamber 8 previously held. At this same time, chambers 2-8 also move one position in the sequence so that chamber 2 is now in the lead "Service" position which chamber 1 previously held, chambers 3-5 moved one position, but remain in "Service", chamber 6 is brought into the last "Service" position which chamber 5 previously held, chamber 7 is moved into a "Rinse" position that chamber 6 previously held and chamber 8 moves to the "Chemical" position that chamber 7 previously held. In this way, the resin in each chamber is being moved counter-currently to the incoming streams. As the resin is exhausted it is moved out of the service cycle, into the regeneration cycle and back finally back into "Service" by successive indexing of the rotating heads.

After one index of the rotating heads 240 and 260 as described in the previous paragraph, the flow paths are modified as follows:

Streams A-E continue as incoming hard water for treatment and are in "Service" and enter the stationary head 230 of multiport rotary valve 200 by conduits 111-115 at port connections 11-15. Streams A-E proceed by internal conduits 226 to rotary head 240 and are redirected by internal transverse conduits 238 back to stationary head 230 and by internal conduits 227 to chamber ports 22-26. Streams A-E then proceed by conduit 122-126 to enter chambers 2-6 through connections 2a-6a. Hard water streams A-E contact the strong acid cation resin contained in chambers 2-6 become soft or treated water streams A'-E' and exit chambers 2-6 through connections 2b-6b and connect by conduits 142-146 to the stationary head 270 at ports 42-46. Streams A'-E' proceed by internal conduits 277 to rotating head 260 and are redirected by internal transverse conduits 258 back to the stationary head 270. Streams A'-E' now proceed by internal conduits 276 and exit at ports 32-36 to conduits 132-136 as treated soft water.

Stream H' by conduit 138 directs untreated water into multiport valve 200 at port 38 in stationary head 270. Stream H' proceeds by an internal conduit 276 to rotating head 260 and is redirected by an internal transverse conduit 258 back to stationary head 270 and proceeds by an internal conduit 277 to exit at port 41. Stream H' proceeds by conduit 141 to chamber 1 through connection 1b. Stream H' proceeds in an upward direction through the resin contained in chamber 1 and proceeds out of chamber 1 through connection 1a as stream H. Stream H proceeds by conduit 121 to stationary head 230 of multiport valve 200 through port 21 and proceeds by an internal conduit 227 to rotary head 240 and is redirected by an internal transverse conduit 238 back to stationary head 230. Stream H proceeds by an internal conduit 226 to exit multiport valve 200 through port 18 where Backwash waste stream H is directed to waste by conduit 118.

Stream G directs a salt (NaCl) solution by conduit 117 into multiport valve 200 through port 17 in stationary head 230. Stream G proceeds by an internal conduit 226 to rotating head 240 and is redirected by an internal transverse conduit 238 back to stationary head 230 and proceeds by an internal conduit 227 to exit through port 28. Stream G then proceeds by conduit 128 to chamber 8 through connection 8a. Stream G proceeds in an downward direction through the resin contained in chamber 8 and proceeds out of chamber 8 through connection 8b as stream G'. Stream G' proceeds by conduit 148 to stationary head 270 of multiport valve 200 through port 48 and proceeds by an internal conduit 277 to rotary head 260 and is redirected by an internal transverse conduit 258 back to stationary head 270. Stream G' then proceeds by an internal conduit 276 to exit the multiport valve at port 37 as regeneration waste stream G' which is directed to waste by conduit 137.

Stream F is treated water used for rinse and proceeds by conduit 116 to enter multiport valve 200 through port 16 in stationary head 230 and proceeds by an internal conduit 226 to rotating head 240 and is redirected by an internal transverse conduit 238 back to stationary head 230. Stream F then proceeds by an internal conduit 227 to exit through port 27 and proceed by conduit 127 to chamber 7 through connection 7a. Stream F proceeds in a downward direction through the resin contained in chamber 7 and proceeds out of chamber 7 through connection 7b as stream F' and connects by conduit 147 to stationary head 270 of multiport valve 200 at port 47. Stream F proceeds by an internal conduit 277 to rotary head 260 and is redirected by an internal transverse conduit 258 back to stationary head 270 and proceeds by an internal conduit 276 to exit multiport valve through port 36 as rinse waste stream F', which is directed to waste by conduit 136.

The rotating heads 240 and 260 of multiport rotary valve 200 remain in the same position and maintain the current flow path by internal transverse conduits 238 and 258 until an end point time. When the end point is reached and capacity for divalent ions in chamber 2 is exhausted, the rotating heads 240 and 260 are again indexed clockwise one position. This index essentially moves by internal transverse conduits 238 and 258, chamber 2 from "Service" and places it into the first regeneration step called "Backwash" which chamber 1 previously held. The remaining chambers also move one position in the sequence. At every index, the chambers essentially move one position forward in the sequence and complete a full cycle 2× in every 360-degree rotation of the rotating heads 240 and 260. In this manner, the use of a turntable in the prior art has been eliminated.

According to the present embodiment, the invention 200 retains complete flexibility in assigning the inlet and outlet ports 11-18 and 31-38 to any desired fluid stream and direction and combination therefore eliminating the fixed configuration issues with prior art valves. Treatment of fluid streams, gas or liquid, in the fluid solid contacting apparatus chambers could, for example, be accomplished by any such media, chemical reactant or physical process like ion exchange, chromatography, adsorption, reaction, catalysis, filtration or heat exchange and is solely determined by the media choice and by fixed conduits exterior to the multiport rotary valve and not by the valve itself, such that multiport rotary valve 200 provides an efficient and continuous means of contacting the media or reactant in the chamber with the various fluid streams.

FIG. 2 shows an exploded perspective of the combined multiport rotary valve of the present invention. Rotary valve 200 comprises two major assemblies, upper multiport rotary valve 215 and lower multiport rotary valve 285; all are of circular shape having substantially equal diameter and each having opposed planar sealing surfaces. The present embodiment of this invention utilizes a keyed and threaded central shaft 205 for assembling the entire rotary valve apparatus and for providing a mechanical means to force a seal of the stationary head 230 to the rotating head 240 and rotating head 260 to stationary head 270. Other means to force the seal of the stationary and rotating heads by means like pneumatic bladder or hydraulic cylinder in combination with internal seals would also be suitable.

Figure 2B:
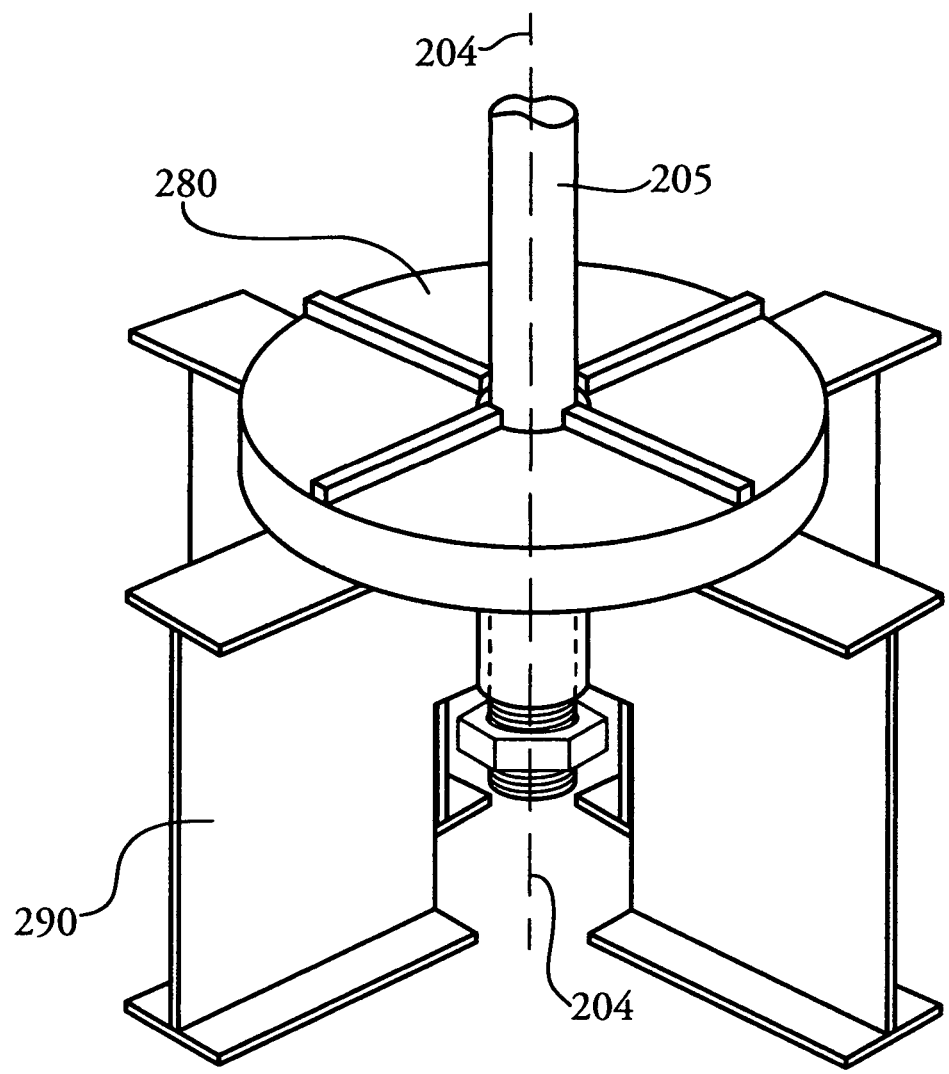
FIG. 2b is a continuation of the exploded perspective of a combined multiport rotary valve in accordance with invention.

The stationary head assemblies 230, 270 are held fixed from rotating by pressure plate 220 and end cap 280 and are forced against the rotating head assemblies 240, 260 by mechanical means from pressure plate 220 while constrained by central shaft 205, nut 202 and end cap 210 and stand 290 from FIG. 2b.

Top stationary head 230 has ports 11-18 for the connection of process inlets and outlets and ports 21-28 for one connection to each fluid solid contacting chamber and has internal conduits in the head for the communication of these ports to a planar face in sealing contact with the top rotating head 240.

Top rotating head 240 is in sealing contact with top stationary head 230 and accepts all fluid flows from top stationary head 230 through holes 241a-248a and 241b-248b and redirects the flows by internal transverse conduits connecting these holes back to the same top stationary head 230.

Sprocket gear 250 is provided for the purpose of moving the two rotating heads 240, 260 by means of external drive motor 292 and drive chain 291.

Bottom rotating head 260 is in sealing contact with bottom stationary head 270 and accepts all fluid flows from the bottom stationary head 270 and redirects the flows by internal transverse conduits back to the same bottom stationary head 270. Rotating head 260 has proximity targets 293 for position indication by proximity sensor 294 to properly align the rotating heads 240, 260 with their respective stationary heads 230, 270.

Bottom stationary head 270 has ports 31-38 for the connection of process inlets and outlets and ports 41-48 for one connection to each fluid solid contacting chambers 1-8 and internal conduits in the head for the communication of these ports to recessed arcuate obround windows 272 and 273 on a planar face in sealing contact with the bottom rotating head 270.

Bottom end cap 280 provides an opposing surface for the assembly and urging of the heads 230, 240, 250, 260 and 270 together.

A drive chain 291 and drive motor 292 indexes the rotating heads upon a signal from a control device (not shown, well known in the art) like a total flow indicator, timer, PLC, DCS or PC system programmed to initiate an index at a selected end point. The drive motor 292 and chain 291 drive the sprocket gear 250 which moves the rotating heads 240, 260 clockwise from a top vantage point until the next target 293 activates the proximity sensor which in turn stops rotation. The drive motor, chain and sprocket gear could be replaced with any such suitable method for moving or indexing the rotating heads like drive shaft, direct gear contact, drive belt or ratchet arrangement.

Stationary heads 230, 270 are preferably made of a polymeric material or composite material that is strongly resistant to abrasion and chemically compatible with the components of the fluid mixture. Rotating heads 240, 260 are preferably made of a machinable metal or of a machinable metal face in conjunction with composite polymeric disks that are all compatible with the components of the fluid mixture to be separated. Alternatively, stationary heads 230, 270 may be made of a machinable metal while the rotating heads may be made of a machinable polymeric or composite all of which are compatible with the components of the fluid mixture to be separated. To simplify construction, the stationary or rotating heads can be made from multiple plates or disks so that the internal conduits are easily routed into the plates and attached or fastened together into a composite head assembly. The rotating and stationary heads are made from materials that are compatible with the components of the fluid mixture to be separated and may be ceramics, composites, polymeric materials, metals, metal alloys and high-performance alloys.

Valve 200 provides for two rotating heads 240, 260 and two stationary heads 230, 270 with only one planar sealing surface between each valve assembly 215, 285 which greatly simplifies the sealing complexities of prior art turntable-less valve designs.

FIG. 2b shows the multiport rotary valve stand 290 supports the bottom end cap 280 and valve apparatus 200 and fixes the central shaft 205 at the vertical axis 204. Bottom end cap 280 can be fixed by any suitable method to the stand 290.

Figure 3:
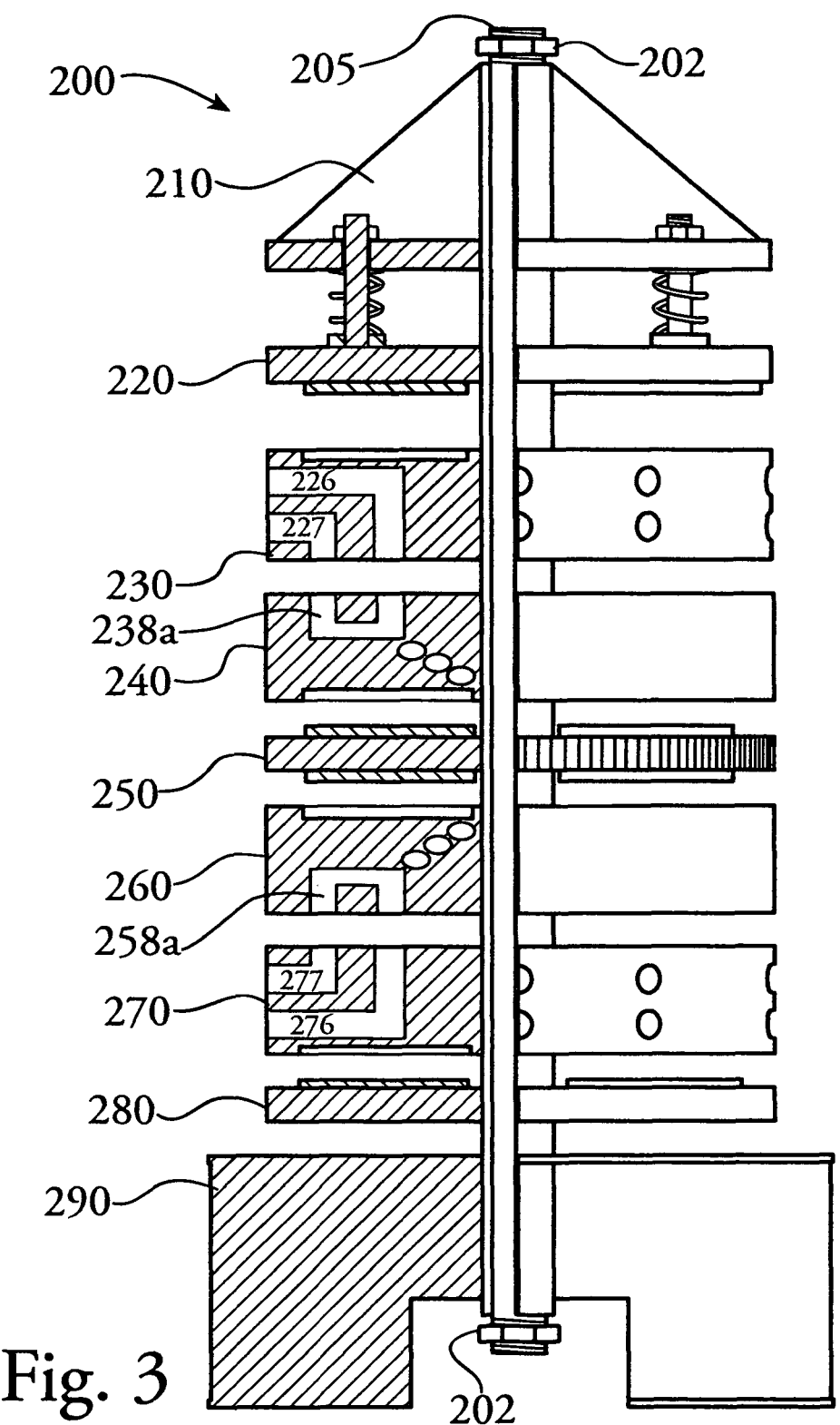
FIG. 3 is an exploded cross sectional view of the combined multiport rotary valve from FIG. 2.

FIG. 3 shows an exploded cross sectional view of multiport rotary valve 200 from FIG. 2 and clearly shows a flow path by one internal conduit 226 from the top stationary head 230 through the internal transverse conduit 238a of the top rotating head 240 redirected back to one internal conduit 227 of the top stationary head 230. Similarly, one internal conduit flow path 276 in the bottom stationary head 270 enters internal transverse conduit 258a in the bottom rotating head 260 and is redirected back to one internal conduit 277 of the bottom stationary head 270. The cross sectional view shows the internal conduits of the stationary heads and rotating heads connect at their respective planar sealing faces. It further shows as an example, the shortest internal transverse conduit length in the rotating heads 240 and 260. For clarity, only one set of internal conduits in is shown in this drawing.

Figures 4, 5:
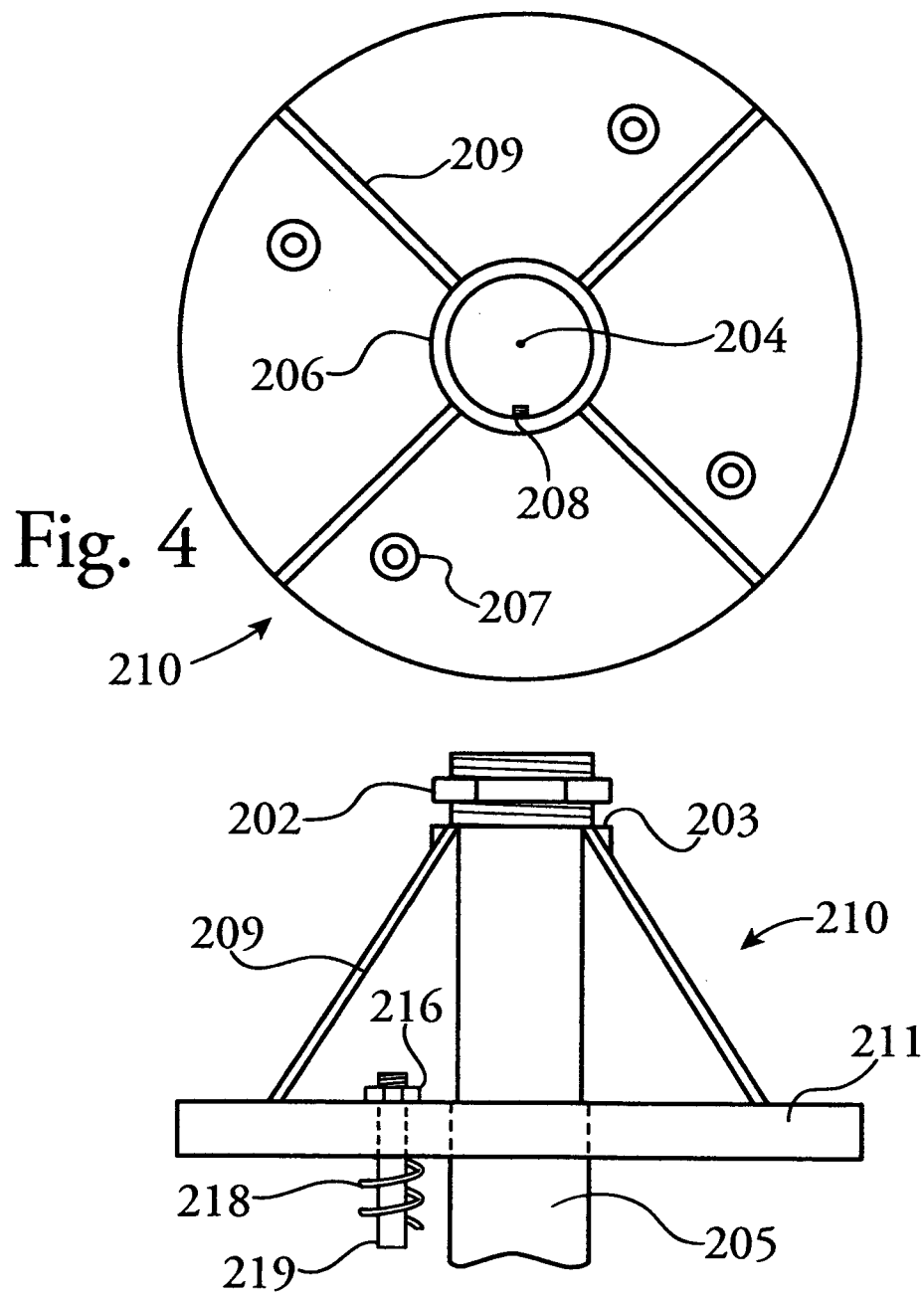
FIG. 4 is a top plan view of top end cap 210 of FIG. 3.
FIG. 5 is a side view of top end cap 210 of FIG. 3.

FIG. 4 and FIG. 5 show top planar and side views of the top end cap 210 preferably made of metal. Gussets 209 substantially strengthen the end plate 211 and locate the shaft tube 206 central to the end plate. The end cap 210 is held fixed from turning by key 208 which mates with the slotted central shaft 205, FIG. 2. The end plate has holes 207 for threaded rods 219 and nuts 216 which constrain the springs 218. While valve 200 uses a mechanically simple method of sealing force by a plurality of springs 218, alternate means of providing a sealing force like hydraulic piston, pneumatic piston or Belleville washers are possible. The internal diameter of 206 is slightly larger than the threaded shaft 205 and essentially limits sideways movement of shaft 205 while surface 203 provides a flat for nut 202 to limit vertical movement of end cap 210.

FIGS. 6, 7 and 8 show side and planar views of pressure plate 220 preferably made of metal and centrally located around shaft 205. FIGS. 6 and 7 show, for example, four threaded rods 219, each with an associated spring 218 and end stop 217. The number and force of the springs are designed to provide adequate sealing pressure for the planar sealing faces of the stationary heads 230, 270 and rotating heads 240, 260 as shown in FIG. 3. FIG. 8 shows four, for example, keys 222 for the horizontal aligning and keeping of the top stationary head 230 of FIG. 3. These keys will prevent rotation of stationary head 230, but allow for some vertical movement necessary for planar sealing with rotating head 240 of FIG. 3.

FIGS. 9, 10 and 11 show side and planar views of top stationary head 230, which includes a planar disk 225, made preferably from a polymeric material. The top face 229 of the top stationary head 230 has a sufficient number of machined in keyways 228 for centrally locating and fixing the head by keys 222 to pressure plate 220 shown in FIG. 8 around axis 204. Internal conduits 226 and 227 are machined in the disk 225 and extend from a radially outward surface 221 of the disk to the planar disk valve face 231. On the radially outer surface 221 the internal conduits 226 end in ports 11 through 18 and the internal conduits 227 end in ports 21 through 28. The top ports 11 through 18 are for process fluid external conduits 111-118 and the bottom ports 21-28 are for fluid solid chamber external conduits 121-128 from FIG. 1. On the planar disk valve face 231, internal conduits 226 end in recessed arcuate obround windows 222 and internal conduits 227 end in recessed arcuate obround windows 223. The recessed arcuate obround windows 222 are spaced equidistant around the face and form an inner concentric circle 222i aligned around central axis 204. The recessed arcuate obround windows 223 are spaced equidistant around the face and form an outer concentric circle 223o aligned around central axis 204. The angular lengths of the recessed arcuate obround windows 222 are equal and at least 2× the angular measurement of any of the equal matching holes 241a-248a on the rotating head 240 of FIG. 12. The angular lengths of the recessed arcuate obround windows 223 are equal and at least 2× the angular measurement of any of the equal matching holes 241b-248b on the rotating head 240 of FIG. 12. The angular length of the recessed arcuate obround windows 222 or 223, allows for flow communication of each window with a matching hole 241a-248a or 241b-248b through 2 indexes of the rotating head 240 from FIG. 12. The depth of the recessed arcuate obround windows 222 and 223 is sufficient to allow proper full flow communication with the rotating head 240 of FIG. 3. Between the recessed arcuate obround windows 222 on the inner concentric circle 222i are equal lands 232 that are equal to or preferably slightly less than equal to the angular measurement of holes 241a-248a on the rotating head 240 of FIG. 12. Between the recessed arcuate obround windows 223 on the outer concentric circle 223o are equal lands 232 that are equal to or preferably slightly less than equal to the angular measurement of holes 241b-248b on the rotating head 240 of FIG. 12. The lands 232 formed on the inner concentric circle 222i are equally offset in angular measurement either way from the lands 232 on the outer concentric circle 223o so as to provide a staggered progression of flow communication between the stationary head 230 and the rotating head holes 241a-248a and 241b-248b upon each index of the rotating head 240 of FIG. 12.

Upon a complete reading of the detailed descriptions for the various figures, it will be appreciated that the recessed arcuate obround windows 222 and 223 and corresponding offset of the land 232 between the windows or holes on the inner and outer concentric circles 222i and 223o allows sequential and proper flow between the multiport valves and chambers without any cross contamination of the various fluid streams. A multiport valve formed solely with holes on both the stationary and rotating head sealing faces, without the recessed arcuate obround windows and offsets will function, but with a different sequence and a resultant cross contamination. It will also be appreciated that the recessed arcuate obround windows 222 and 223 and corresponding offset of the land 232 between the windows or holes on the inner and outer concentric circles can be moved from the stationary head 230 to the rotating head 240 in any combination. The recessed arcuate obround windows can be placed on one head, either the stationary 230 or the rotating 240, while the land offset between windows or holes will also be placed on one head, either the stationary 230 or the rotating head 240. Therefore, there are at least 4 combinations of recessed arcuate obround windows and land offset that allows for proper flow communication between the stationary head 230 and rotating head 240. It is critical to note that the top and bottom rotating heads 240 and 260 must move in concert so as to maintain the proper and complimentary flow paths.

Figure 12:
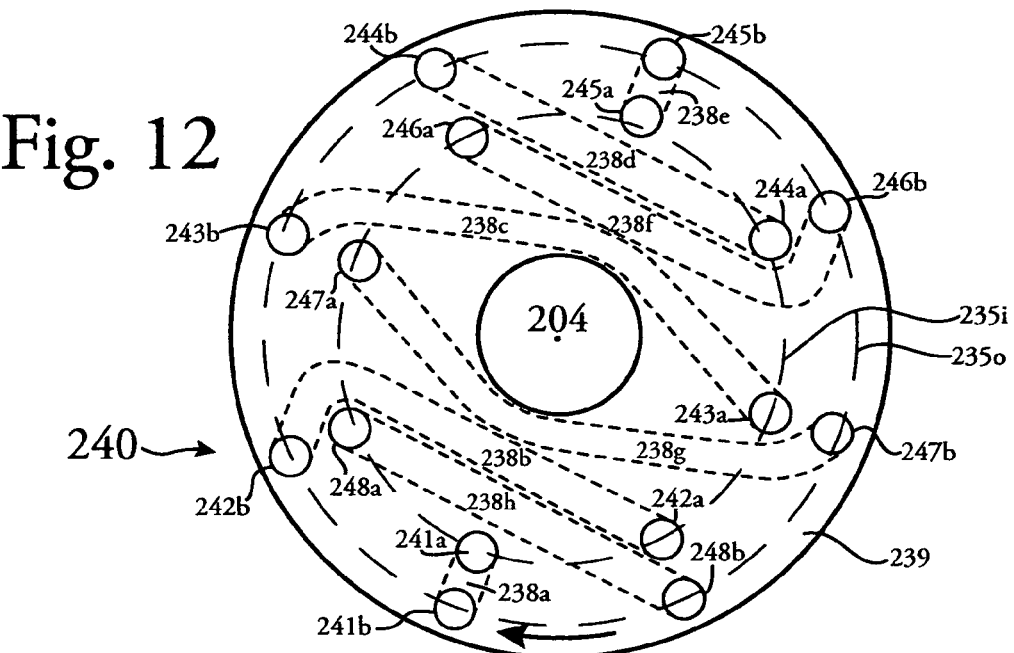
FIG. 12 is a top plan view of the top rotating head 240 of FIG. 3.
Figure 13:
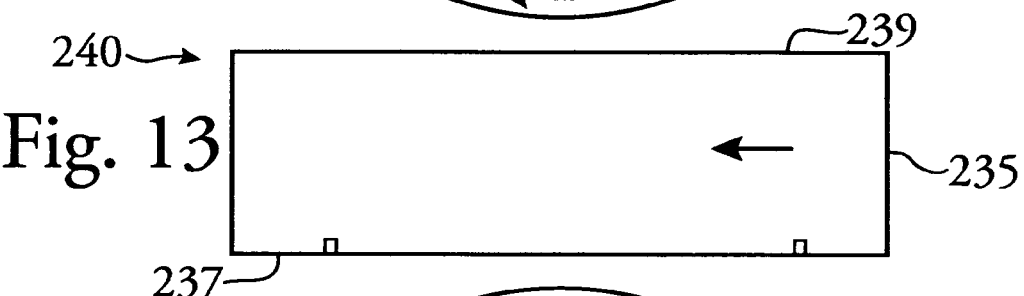
FIG. 13 is a side view of the top rotating head 240 of FIG. 3.
Figure 14:
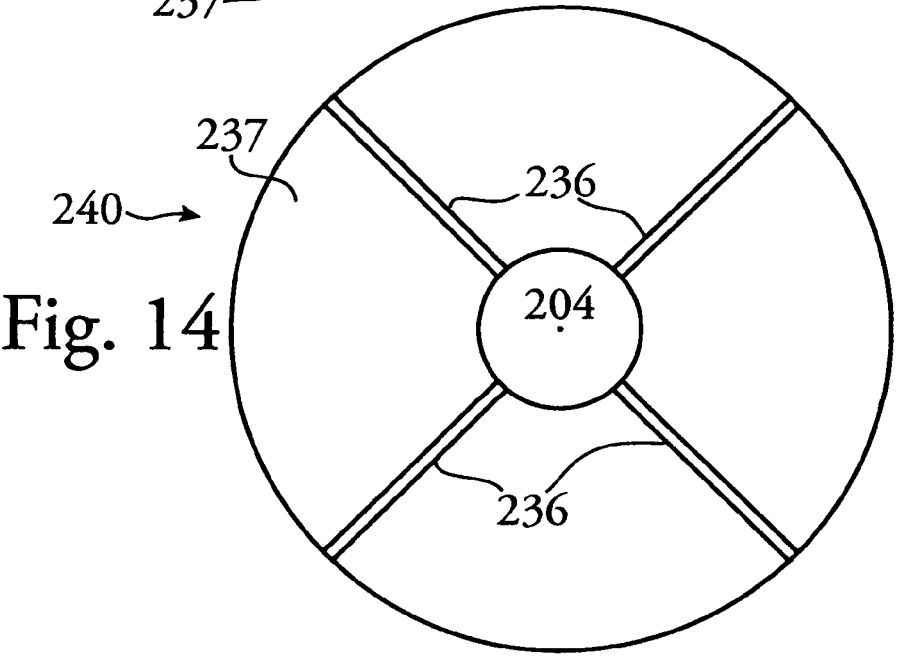
FIG. 14 is a bottom plan view of the top rotating head 240 of FIG. 3.

FIGS. 12, 13 and 14 show side and planar views of top rotating head 240 which includes a planar disk 235 of the afore mentioned material, preferably with a metal planar face 239. The bottom face 237 of the top rotating head 240 has a sufficient number of machined in keyways 236 for centrally locating and fixing the head by keys 254 to the sprocket plate 250 of FIG. 3 and FIG. 15 around axis 204. The top planar disk face 239 has holes 241a-248a that are spaced equidistant and form an inner concentric circle 235i and are in communication with recessed arcuate obround windows 222 in FIG. 11. The top planar disk face 239 has holes 241b-248b that are spaced equidistant and form an outer concentric circle 235o and are in communication with recessed arcuate obround windows 223 in FIG. 11. In this embodiment, the holes in the inner and outer concentric circles are sufficient for proper flow and are equal in diameter and are angularly equidistant apart and aligned radially in angular measurement. For this example, eight fluid solid chambers were used and therefore there are eight inner and eight outer holes, but any number of chambers and pairs of holes can be used equal to or greater than two. It is critical that numbering of the holes 241a-248a on the inner concentric circle 235i and 241b-248b on the outer concentric circle 235o, start at a nearest neighbor and proceed in opposite directions resulting in a very specific pattern of internal transverse conduits that redirect the flow between holes on the inner and outer concentric circles. In this embodiment, 241a on the inner concentric circle starts the pattern and connects to the nearest neighbor on the outer concentric circle, which is labeled 241b. Proceeding from that point, the inner concentric circle holes are labeled consecutively proceeding counterclockwise, looking from the top. Similarly, the outer concentric circle holes are labeled consecutively proceeding in an opposite or clockwise direction, looking from the top. Internal transverse conduits 238 are machined internally into the disk 235 in a pattern so as to connect each inner hole to an outer hole in the pattern of 241a to 241b, 242a to 242b, through to 248a to 248b. It is critical in a combined multiport rotary valve that the top multiport rotary valve 215 is aligned with the bottom multiport rotary valve 285 so as the flows between the valves are complimentary. For ease of manufacturing, it is envisioned that the top planar face 239 may be made of one of the previously referenced metals, while the internal conduits are machined into a number of easily machinable disk materials and combined to form a composite disk 235.

Figure 15:
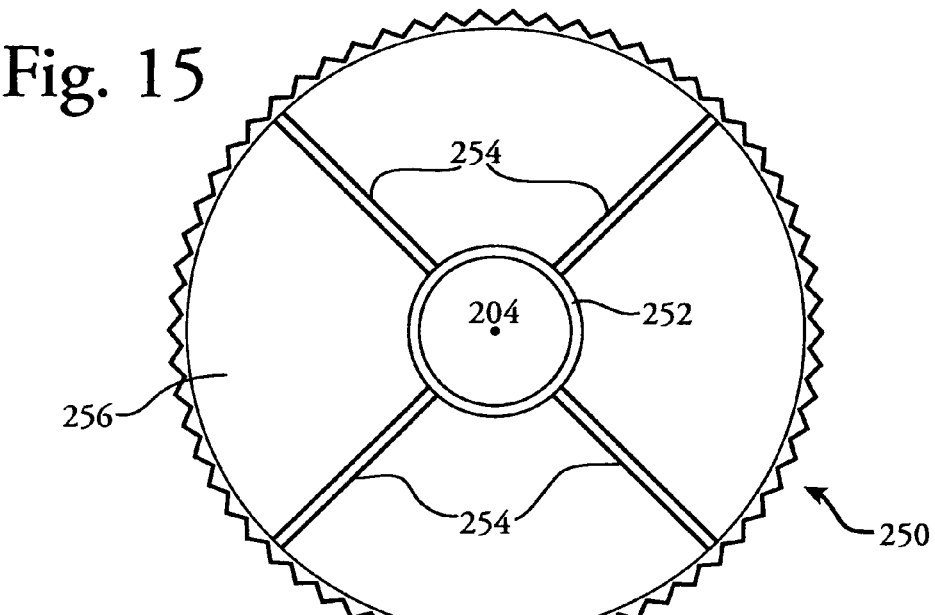
FIG. 15 is a top plan view of the sprocket gear 250 of FIG. 3.
Figure 16:
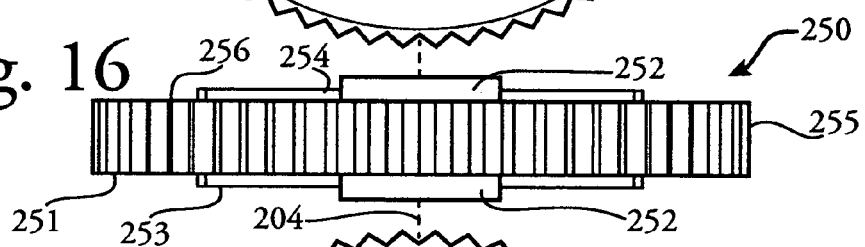
FIG. 16 is a side view of the sprocket gear 250 of FIG. 3.
Figure 17:
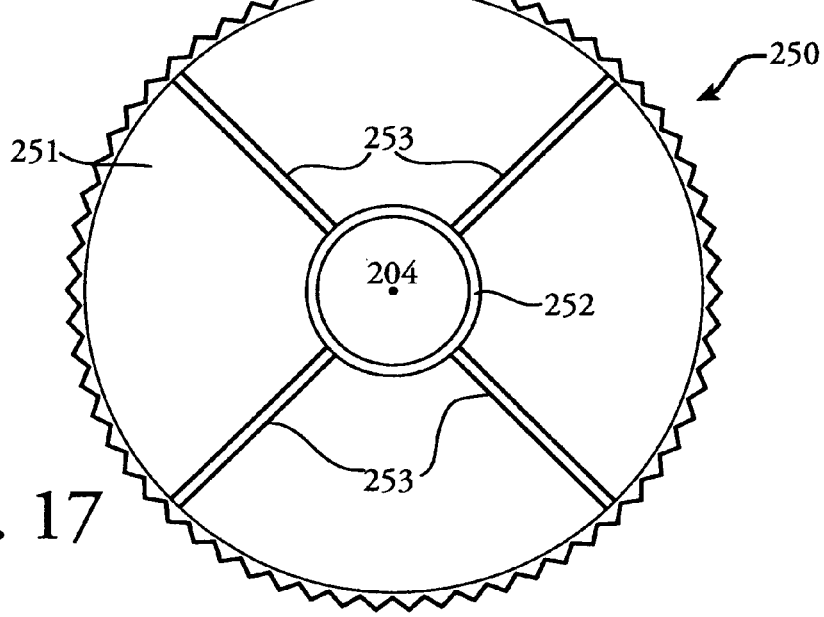
FIG. 17 is a bottom plan view of the sprocket gear 250 of FIG. 3.

FIGS. 15, 16 and 17 show the central sprocket gear assembly 250 preferably made of metal that provides for rotational movement of the rotating heads 240 and 260. The sprocket is axially aligned around the central shaft 205 and axis 204 by bearings 252. The bearings allow for smooth and precise rotation of the sprocket without impeding slight vertical movement of the various heads 230, 240, 260 and 270. FIGS. 15 and 17 show keys 254 and 253 for centrally locating and fixing the rotating heads 240 and 260 of FIG. 3. The keys provide for rotational force to the rotating heads when the sprocket is moved. The sprocket has teeth 255 for engagement with the chain 291 and drive motor 292 of FIG. 2.

Figure 18:
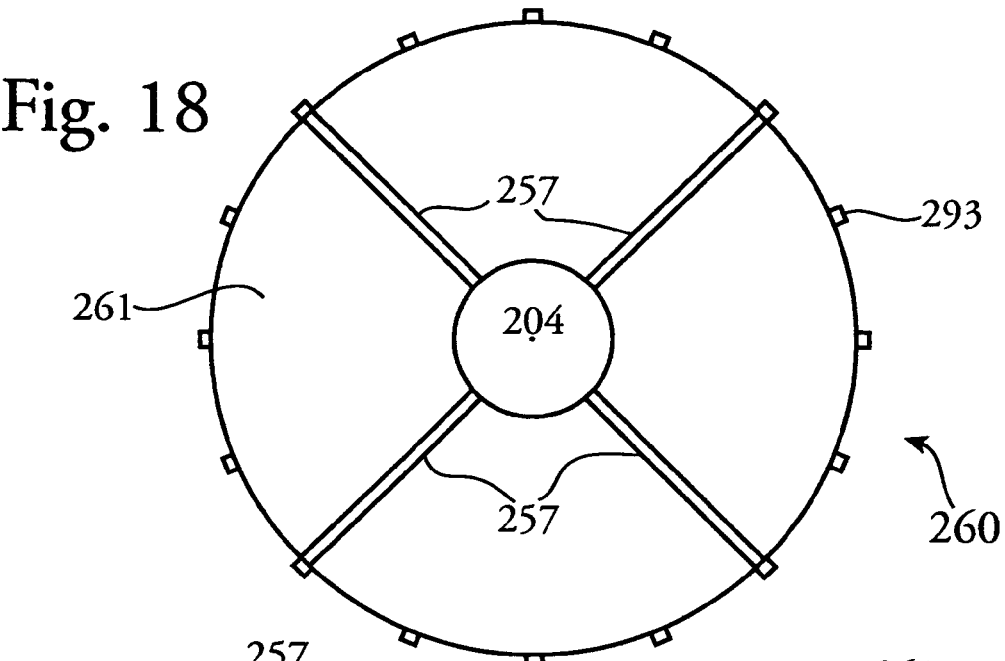
FIG. 18 is a top plan view of the bottom rotating head 260 of FIG. 3.
Figure 19:
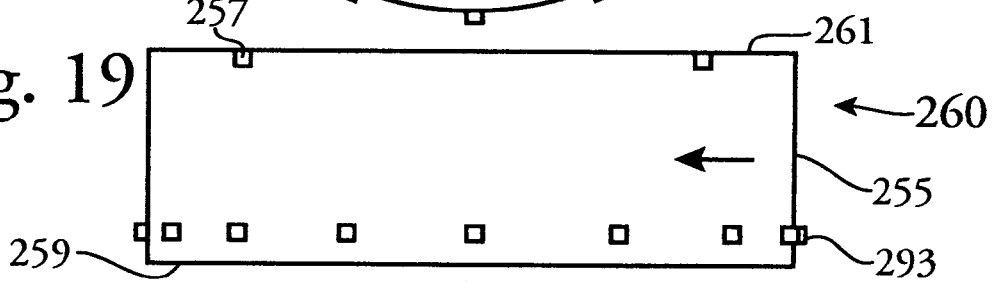
FIG. 19 is a side view of the bottom rotating head 260 of FIG. 3.
Figure 20:
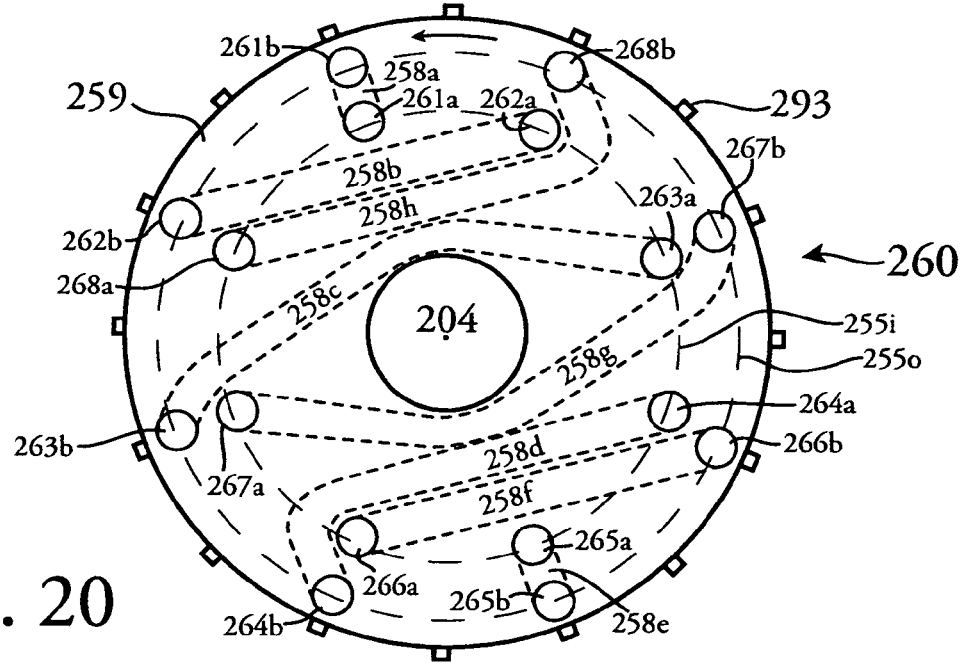
FIG. 20 is a bottom plan view of the bottom rotating head 260 of FIG. 3.

FIGS. 18, 19 and 20 show side and planar views of bottom rotating head 260 which includes a planar disk 255 of the afore referenced material, preferably with a metal planar face. The top face 261 of the bottom rotating head 260 has a sufficient number of machined in keyways 257 for centrally locating and fixing the head by keys 253 to the sprocket plate 250 of FIG. 17 around axis 204. The bottom planar disk face 259 has holes 261a-268a that are spaced equidistant and form an inner concentric circle 255i and are in communication with recessed arcuate obround windows 272 in FIG. 21. The bottom planar disk face 259 has holes 261b-268b that are spaced equidistant and form an outer concentric circle 255o and are in communication with recessed arcuate obround windows 273 in FIG. 21. In this embodiment, the holes in the inner and outer concentric circles are sufficient for proper flow and are equal in diameter and are angularly equidistant apart and aligned radially in angular measurement. For this example, eight fluid solid chambers were used and therefore there are eight inner and eight outer holes, but any number of chambers and pairs of holes can be used equal to or greater than two. It is critical that numbering of the holes 261a-268a on the inner concentric circle 255i and 261b-268b on the outer concentric circle 255o, start at a nearest neighbor and proceed in opposite directions resulting in a very specific pattern of conduits that redirect the flow between inner and outer holes. In this embodiment, 261a on the inner concentric circle starts the pattern and connects to the nearest neighbor on the outer concentric circle, which is labeled 261b. Proceeding from that point, the inner concentric circle holes are labeled consecutively proceeding clockwise looking from the bottom. Similarly, the outer concentric circle holes are labeled consecutively proceeding in an opposite or counter clockwise direction looking from the bottom. It will be noted that the second multiport valve 285 of FIG. 3 is numbered in mirror image to the top multiport valve 215 and vertically aligned at the same starting point numbers so as to maintain complimentary flow paths between the valves. Internal transverse conduits 258 are machined internally into the disk 255 in a pattern so as to connect each inner hole to an outer hole in the pattern of 261a to 261b, 262a to 262b, through to 268a to 268b. For ease of manufacturing, it is envisioned that the top planar face 259 may be made one of the previously referenced metals, while the internal conduits are machined into a number of easily machinable disk materials and combined to form a composite disk 255.

Rotating head 260 has 2× the number of targets 293 as number of chambers described in FIG. 1 and are made of any such material that can be registered by proximity sensor 294. The targets 293 are precisely located around the rotating head 260 to indicate when the rotary and stationary head holes and recessed arcuate obround windows are aligned. In the example discussed in FIG. 1, there are eight chambers and 16 targets aligned with the 16 possible flow paths.

Figure 21:
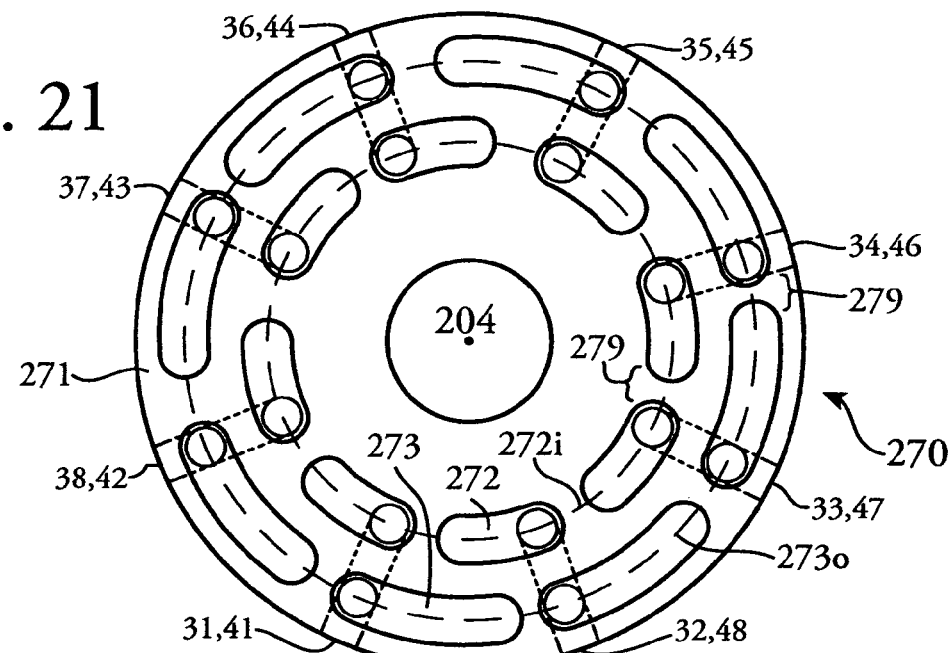
FIG. 21 is a top plan view of the bottom stationary head 270 of FIG. 3.
Figure 22:
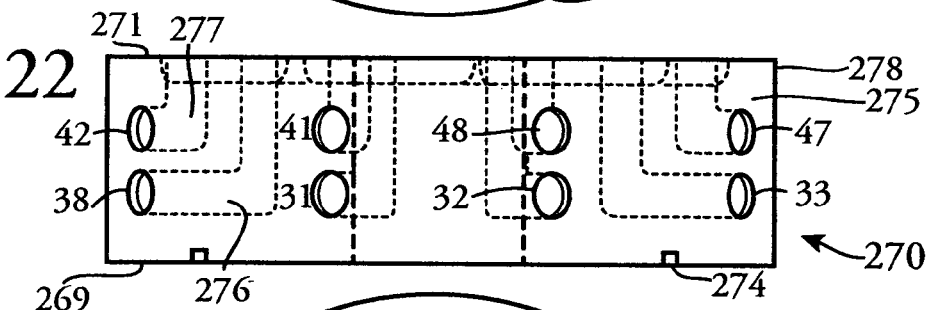
FIG. 22 is a side view of the bottom stationary head 270 of FIG. 3.
Figure 23:
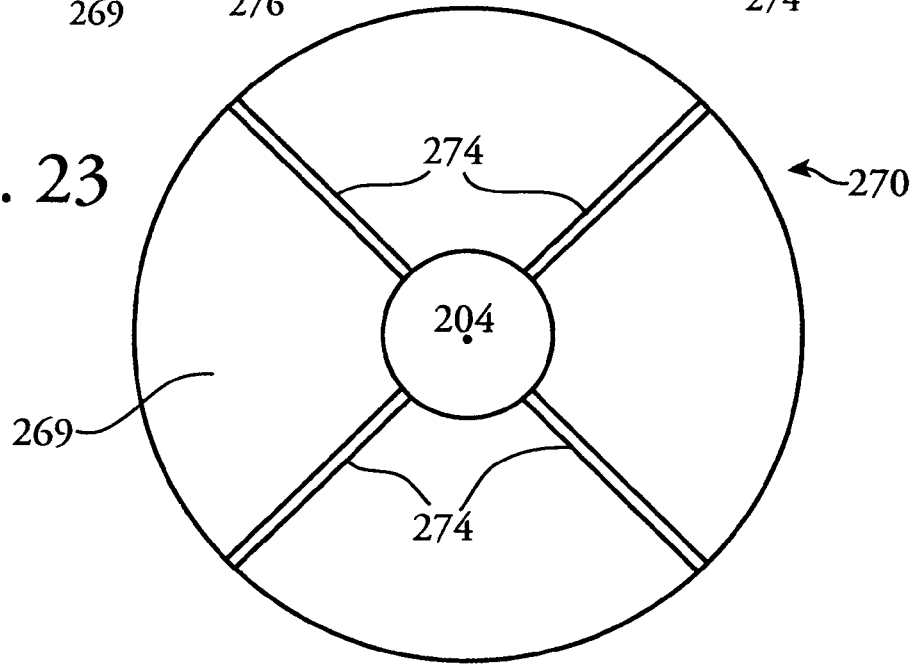
FIG. 23 is a bottom plan view of the bottom stationary head 270 of FIG. 3.

FIGS. 21, 22 and 23 show side and planar views of bottom stationary head 270, which includes a planar disk 275, made preferably from a polymeric material. The bottom face 269 of the bottom stationary head 270 has a sufficient number of machined in keyways 274 for centrally locating and fixing the head by the keys 281 to end plate 280 of FIG. 2b and FIG. 24 around axis 204. Internal conduits 276 and 277 are machined in the disk 275 and extend from a radially outward surface 278 of the disk to the planar disk valve face 271. On the radially outer surface 278 the internal conduits 276 end in ports 31 through 38 and the internal conduits 277 end in ports 41 through 48. The bottom ports 31 through 38 are for process fluid conduits 131-138 and the top ports 41-48 are for fluid solid chamber conduits 141-148 from FIG. 1. On the planar disk valve face 271, internal conduits 276 end in recessed arcuate obround windows 272 and internal conduits 277 end in recessed arcuate obround windows 273. The recessed arcuate obround windows 272 are spaced equidistant around the face and form an inner concentric circle 272i aligned around central axis 204. The recessed arcuate obround windows 273 are spaced equidistant around the face and form an outer concentric circle 273o aligned around central axis 204. The angular lengths of the recessed arcuate obround windows 272 are equal and at least 2× the angular measurement of any of the equal matching holes 261a-268a on the rotating head 260 of FIG. 20. The angular lengths of the recessed arcuate obround windows 273 are equal and at least 2× the angular measurement of any of the equal matching holes 261b-268b on the rotating head 260 of FIG. 20. The angular length of the recessed arcuate obround windows, 272 or 273 allows for flow communication of each window with a matching hole 261a-268a or 261b-268b through 2 indexes of the rotating head 260 of FIG. 20. The depth of the recessed arcuate obround windows 272 and 273 is sufficient to allow proper full flow communication with the rotating head 260 of FIG. 3. Between the recessed arcuate obround windows 272 on the inner concentric circle 272i are equal lands 279 that are equal to or preferably slightly less than equal to the angular measurement of holes 261a-268a on the rotating head 260 of FIG. 20. Between the recessed arcuate obround windows 273 on the outer concentric circle 273o are equal lands 279 that are equal to or preferably slightly less than equal to the angular measurement of holes 261b-268b on the rotating head 260 of FIG. 20. The lands 279 formed on the inner concentric circle 272i are equally offset in angular measurement either way from the lands 279 on the outer concentric circle 273o so as to provide a staggered progression of flow communication between the stationary head 270 and the rotating head holes 261a-268a and 261b-268b upon each index of the rotating head 260 of FIG. 20.

Again, upon a complete reading of the detailed descriptions for the various figures, it will be appreciated that the recessed arcuate obround windows 272 and 273 and corresponding offset of the land 279 between the windows or holes on the inner and outer concentric circles allows sequential and proper flow between the multiport valves and chambers without any cross contamination of the various fluid streams. A multiport valve formed solely with holes on both the stationary and rotating head sealing faces, without the recessed arcuate obround windows and offsets will function, but with a different sequence and a resultant cross contamination. It will also be appreciated that the recessed arcuate obround windows 272 and 273 and corresponding offset of the land 279 between the windows and holes on the inner and outer concentric circles can be moved from the stationary head 270 to the rotating head 260 in any combination. The recessed arcuate obround windows can be placed on one head, either the stationary 270 or the rotating 260, while the land offset will also be placed on one head, either the stationary 270 or the rotating head 260. Therefore, there are at least 4 combinations of recessed arcuate obround windows and land offset that allow for proper flow communication between the stationary head 270 and rotating head 260. It is critical to note that the top and bottom rotating heads 240 and 260 must move in concert so as to maintain the proper and complimentary flow paths.

Figure 24:
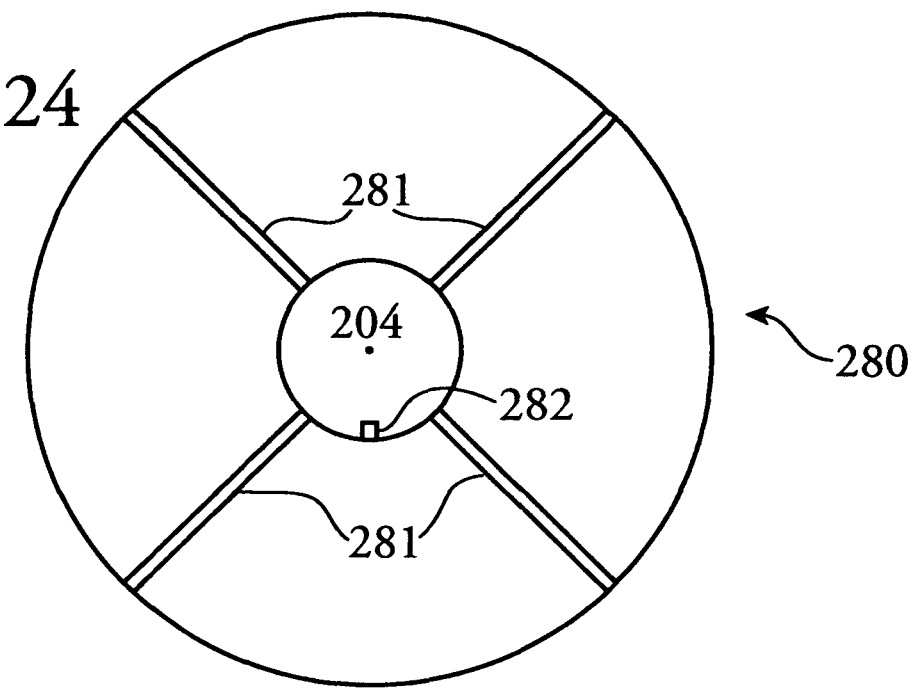
FIG. 24 is a top plan view of bottom end cap 280 of FIG. 3
Figure 25:
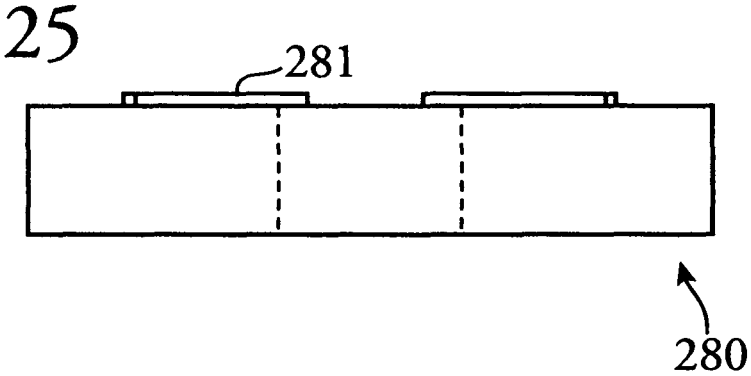
FIG. 25 is a side view of bottom end cap 280 of FIG. 3

FIGS. 24 and 25 show the bottom end plate 280, preferably made of metal, axially aligned around the central axis 204. FIG. 24 shows keys 281 for fixing and centrally locating the bottom stationary head 270 of FIG. 23 around the central axis 204. Key 282 fixes the bottom end plate 280 with the keyed central shaft 205 of FIG. 2b and FIG. 26. The end plate 280 provides a face for opposing the force from the pressure plate 220 of FIG. 7.

Figure 26:
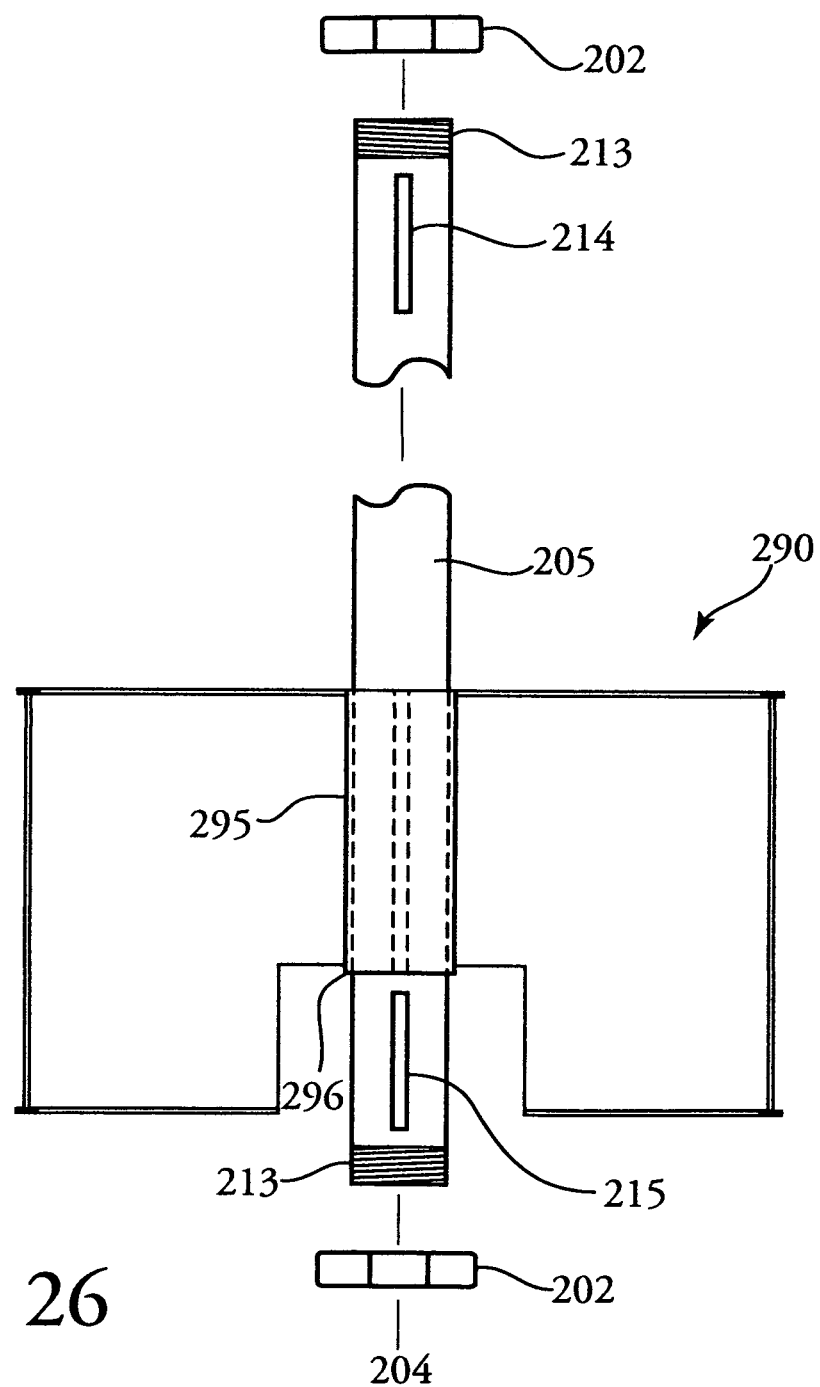
FIG. 26 is a side view of the multiport rotary valve stand 290 of FIG. 3.

FIG. 26 shows a side view of multiport rotary valve stand 290 and shaft 205 with threaded ends 213 and keyways 214 to mate with key 208 from FIG. 4 and keyway 215 for mating with key 282 from FIG. 24. The stand is preferably made of metal and designed so as to adequately support the end plate 280 of FIG. 25 yet not unreasonably obstruct the valve heads. End plate 280 can be affixed to stand 290 in any suitable way so as to avoid rotation of the end plate 280. Stand 290 is also designed to adequately fix central shaft tube 295 which limits horizontal movement of shaft 205 while surface 296 provides a flat for constraining the vertical movement of shaft by nuts 202.

Figure 27:
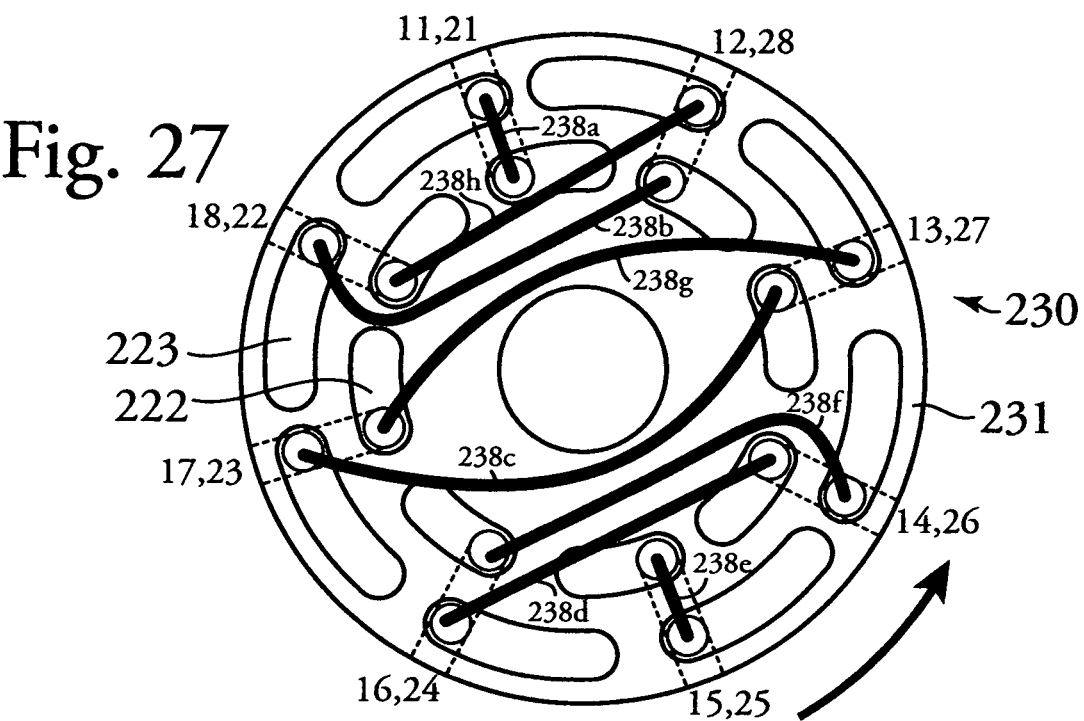
FIG. 27 is a bottom plan view of stationary head 230 of FIG. 11 with simplified overlay of rotating head internal transverse conduits 238 from FIG. 12 before one index.

FIG. 27 is an example of how the internal transverse conduits 38 of rotating head 240 from FIG. 12 redirect the flow back into stationary head 230 of FIGS. 10 and 11 before an index of the rotating head 240. The stationary head 230 is shown in plan view, looking up, with bottom face 231 exposed. The recessed arcuate obround windows 222 on the inner concentric circle connect to ports 11-18 by internal conduits 226 and recessed arcuate obround windows 223 on the outer concentric circle connect to ports 21-28 by internal conduits 227 as per FIG. 10. The internal transverse conduits 238 which connect to holes 241a-248a and 241b-248b in rotating head 240 from FIG. 12 are in communication with stationary head 230 and are shown in dark overlay on the face 231 of the stationary head 230. It can be seen that port 11 will connect to port 21 through internal transverse conduit 238a. Port 12 will connect to port 22 through internal transverse conduit 238b and so on, until port 18 will connect with port 28 through internal transverse conduit 238h.

Figure 28:
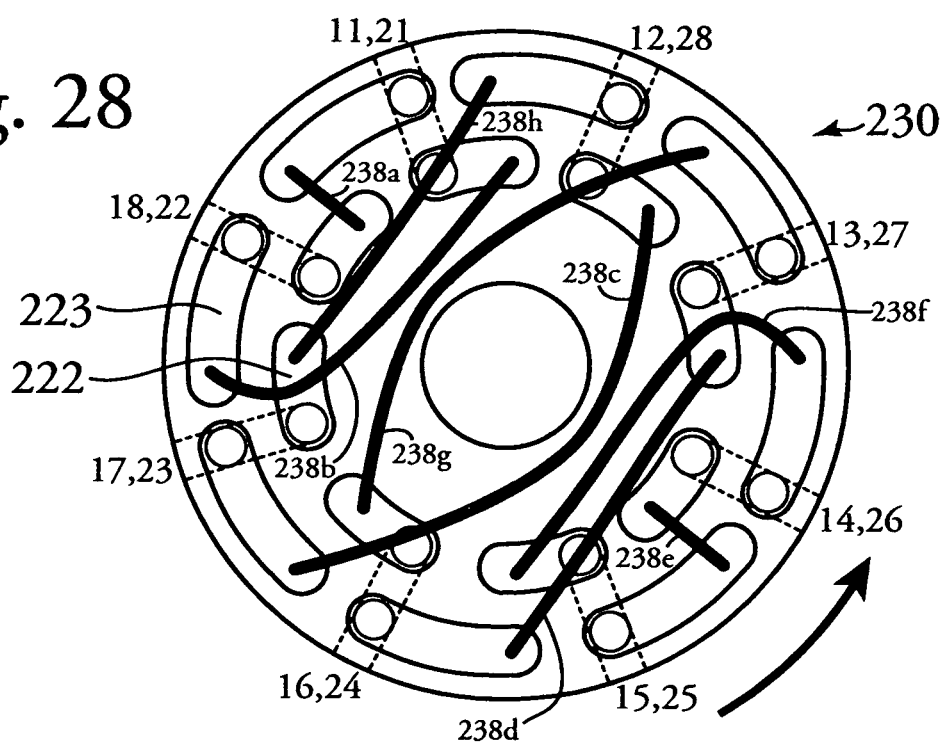
FIG. 28 is a bottom plan view of stationary head 230 of FIG. 11 with simplified overlay, of rotating head internal transverse conduits 238 from FIG. 12 after one index.

FIG. 28 is an example of how the internal transverse conduits 38 of rotating head 240 from FIG. 12 redirect the flow back into stationary head 230 of FIGS. 10 and 11 after one index of the rotating head 240. Internal transverse conduits 238 have been indexed one position from that in FIG. 27 counterclockwise looking from a bottom perspective. Port 11 will now connect to port 22 though internal transverse conduit 238b. Port 12 will connect to port 23 through internal transverse conduit 238c and so on until port 18 will connect to port 21 by internal transverse conduit 238a. In this manner, the internal transverse conduits sequentially move the flows from one chamber to the next upon each index. Combining the top multiport valve 215 with the bottom multiport valve 285 and indexing both valves in concert, allows proper and sequential flow through the various chambers. In the 8 chamber example two complete cycles are accomplished in each revolution of the rotating heads. Combining this concept with the water softener example described in FIG. 1, it can be seen how the chambers move sequentially through the entire process.

Therefore, the combined multiport rotary valve 200 with recessed arcuate obround windows and offsets operates as follows: By means of the drive motor 292 the rotating heads 240, 260 are moved together to a position where a target 293 aligns with the proximity sensor 294. For this example, the rotating heads are aligned so stream A will connect with fluid solid chamber 1 as will the other streams B through H align with fluid solid chambers 2 through 8. Referring back to FIG. 1, FIG. 10, FIG. 11, FIG. 12, FIG. 20, FIG. 21, 22 and FIG. 27 for the above-mentioned water softening application and using only feed water stream A as an example, stream A will enter by conduit 111 the invention 200 at port 11 of the top stationary head 230 and proceeds through an internal conduit 226 to a recessed arcuate obround window 222 on the inner concentric circle 222i at the planar face 231 disposed in sealing contact with the top rotating head planar face 239, the flow enters the rotating head hole 241a on the inner concentric circle 235i and proceeds through internal transverse conduit 238a to hole 241b on the outer concentric circle 235o on the top rotating head planar face 239 and reenters the top stationary head 230 at a recessed arcuate obround window 223 at the outer concentric circle 223o and proceeds by an internal conduit 227 to the stationary head port 21. Stream A then proceeds by conduit 121 to enter the first fluid solid contacting chamber 1 by 1a and makes contact with the treatment resin contained therein, it then exits chamber 1 at 1b as treated stream A' and enters by conduit 141 the bottom stationary head 270 at port 41. Treated stream A' then proceeds by an internal conduit 277 to a recessed arcuate obround window 273 on the outer concentric circle 273o on the top planar face 271 of the bottom stationary head 270 disposed in sealing contact with the bottom rotating head planar face 259 and proceeds into the bottom rotating head at hole 261b on the outer concentric circle 255o. Stream A' proceeds by internal transverse conduit 258a through the bottom rotating head 260 and is redirected to the rotating head planar surface 259 and hole 261a on the inner concentric circle 255i. Stream A' crosses back through the planar surface to bottom stationary head 270 and enters by a recessed arcuate obround window 272 on the inner concentric circle 272i and proceeds by conduit 276 to exit the invention at port 31 and external conduit 131. In this 8-chamber example, the other 7 streams will proceed to their respective 7 chambers through their respective paths. The 8 fluid streams will continue with the same paths until such a time when a control device initiates an index of the rotary heads 240 and 260 one position clockwise when viewed from the top, to the next target position 293.

After the first clockwise index, stream A enters the invention 200 by conduit 111 at port 11 of the top stationary head 230 and proceeds through an internal conduit 226 to a recessed arcuate obround window 222 on the inner concentric circle 222i at the planar face 231 disposed in sealing contact with the top rotating head planar face 239. Due to the rotation of head 240, stream A enters a new rotating head hole 242a on the inner concentric circle 235i and proceeds through the internal transverse conduit 238b to hole 242b on the outer concentric circle 235o on the top rotating head planar face 239 and reenters the top stationary head 230 at a recessed arcuate obround window 223 on the outer concentric circle 223o, passes through an internal conduit 227 and exits at port 22. Stream A then proceeds by conduit 122 to enter by 2a the second fluid solid contacting chamber 2 and makes contact with the treatment resin contained therein, it then exits the chamber at 2b as treated stream A' and proceeds by conduit 142 to enter the bottom stationary head 270 at port 42. Treated stream A' then proceeds by an internal conduit 277 to a recessed arcuate obround window 273 on the outer concentric circle 273o on the top planar face 271 of the bottom stationary head 270 disposed in sealing contact with the bottom rotating head planar face 259. Due to the recessed arcuate obround window 273 in the bottom stationary head 270, treated stream A' proceeds back into the bottom rotating head 260 at the previous hole 261b on the outer concentric circle 255o. Stream A' proceeds by the internal transverse conduit 258a in the bottom rotating head 260 and is redirected to hole 261a on the inner concentric circle 255i on the rotating head planar surface 259. Stream A' crosses back through the planar surface to bottom stationary head 270 and enters by a recessed arcuate obround window 272 on the inner concentric circle 272i associated with port 31 and proceeds to exit the invention by conduit 131.

After the second clockwise index, stream A enters the invention by conduit 111 at port 11 of the top stationary head 230 and proceeds through an internal conduit 226 to a recessed arcuate obround window 222 on the inner concentric circle 222i at the planar face 231 disposed in sealing contact with the top rotating head planar face 239. Due to the recessed arcuate obround window 222, stream A continues to enter the previous rotating head hole 242a on the inner concentric circle 235i and proceeds through the internal transverse conduit 238b to hole 242b on the outer concentric circle 235o on the top rotating head planar face 239. The stream now reenters the top stationary head 230 at a recessed arcuate obround window 223 on the outer concentric circle 223o, passes through an internal conduit 227 and exits at port 23. Stream A then proceeds by conduit 123 to enter by 3a the third fluid solid contacting chamber and makes contact with the treatment resin contained therein, it then exits the chamber at 3b as Treated stream A' and proceeds by conduit 143 to enter the bottom stationary head 270 at port 43. Treated stream A' then proceeds by an internal conduit 277 to a recessed arcuate obround window 273 on outer concentric circle 273o on the top planar face 271 of the bottom stationary head 270 disposed in sealing contact with the bottom rotating head planar face 259 and because of the recessed arcuate obround window proceeds back into the bottom rotating head at the same hole 262b on the outer concentric circle 255o. Stream A' proceeds by internal transverse conduit 258b through the bottom rotating head 260 and is redirected to hole 262a on the inner concentric circle 255i on the rotating head planar surface 259. Stream A' crosses back through the planar surface to bottom stationary head 270 and enters by a recessed arcuate obround window 272 on the inner concentric circle 272i and proceeds by internal conduit 276 to exit the invention 200 at port 31 and conduit 131. The third index will move stream A through chamber 4 and so on until stream A comes back to chamber 1 upon the 8th index which is one half of a complete cycle or 180 angular degrees. This pattern will proceed upon each index until it has completed the sequence 2× in one 360-degree revolution of the rotating heads. All of the other chambers will follow the same pattern so as to move each chamber counter currently and sequentially through the various feed streams A through H.

Figure 29:
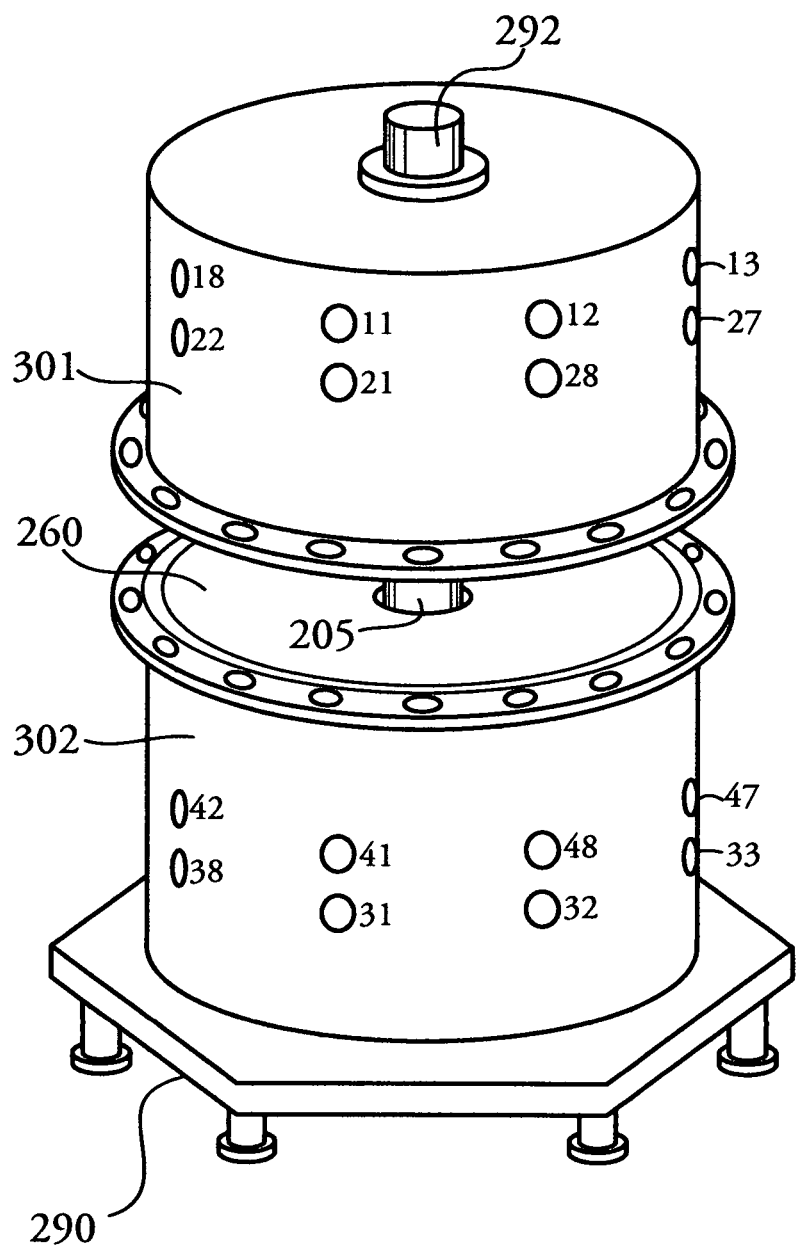
FIG. 29 is a perspective view of an alternative stand, housing and drive of multiport rotary valve 200 from FIG. 3.

FIG. 29 shows an alternative stand and housing for the combined multiport rotary valve 200 using an outer clamshell housing 301 and 302 combined with a motor and gearbox 292 driving the central drive shaft 205 on valve stand 290. The outer clamshell housing will prevent rotation of the stationary heads, while allowing the rotating heads to move. The central drive shaft will be connected to the rotating heads and drive them at the proper time. The outer housing will encase and urge the rotating and stationary heads together around a central shaft by mechanical, hydraulic or pneumatic means.

The foregoing is a description of the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing form the scope of the present invention as defined by the following claims.

What is claimed is:

1. A multiport valve apparatus for purifying, treating and separating fluids by directing multiple fluid streams into and out of a fluid-solid contacting apparatus having a plurality of fluid-solid contacting chambers, said multiport valve comprising:

a rotating cylindrical-shaped head having a circular-shaped sealing base, a circular-shaped fastening base with an axis of rotation therethrough the center of said bases and a cylinder side surface connecting said bases, with said bases having a radius, said sealing base having an inner concentric circle with a radius that is substantially less than said sealing base radius and said sealing base having an outer concentric circle with a radius that is greater than said inner circle radius but less than said sealing base radius;

said sealing base further comprising a plurality of first rotating ports centered on the outer concentric circle, spaced radially equidistant from one another and further comprising a plurality of second rotating ports centered on said inner concentric circle also spaced radially equidistant from one another, wherein the plurality of first rotating ports and the plurality of second rotating ports are equal to one another in number and wherein each of said rotating ports has a diameter;

wherein each of said rotating ports further comprises an arcuate obround-shaped recess aligned along the respective inner and outer concentric circles with each recess having a width corresponding to the diameter of each port and having a length such that the space between each equidistant recess from an adjacent recess is approximately less than or equal to the cross-sectional area of each port;

wherein each first rotating port is connected to its corresponding second rotating port via a transverse channel to provide a rotating flow pair and;

wherein each flow pair are connected in the following manner:

starting with any first rotating port and then connecting that first rotating port to the nearest radially adjacent second rotating port via a transverse channel to form the first rotating flow pair, then connecting the next immediately radially adjacent clockwise first rotating port from said starting first rotating port to the nearest immediately radially adjacent counterclockwise second rotating port from said starting second rotating port via a transverse channel to form the second rotating flow pair, and so on until each first rotating port is connected to a second rotating port and wherein the number of rotating flow pairs corresponds to the number of chambers;

wherein upon rotation of said valve, each of said rotating flow pairs can be sequenced to connect to said plurality of fluid-solid contacting chambers to direct fluid streams into and out of said fluid-contacting chambers.

2. The multiport valve of claim 1 wherein each outer rotating port and its corresponding recess is located at a same outer point along the length of its corresponding recess and wherein each inner rotating port and its corresponding recess is located at a same inner point along the length of its corresponding recess.

3. A multiport valve apparatus for purifying, treating and separating fluids by directing multiple fluid streams into and out of a fluid-solid contacting apparatus having a plurality of fluid-solid contacting chambers, said multiport valve comprising:

a fixed cylindrical-shaped head having a circular-shaped sealing base, a circular-shaped fastening base with a central axis therethrough the center of said bases and a side surface connecting said bases, with said bases having a radius, said sealing base having an inner concentric circle with a radius that is substantially less than said sealing base radius and said sealing base having an outer concentric circle with a radius that is greater than said inner circle radius but less than said sealing base radius; wherein said sealing base further comprising a plurality of first fixed ports centered on said outer concentric circle, spaced radially equidistant from one another and a plurality of second fixed ports centered on said inner concentric circle also spaced radially equidistant from one another, wherein the plurality of first fixed ports and second fixed ports are equal to one another in number;

wherein each of said fixed ports has a diameter wherein each of said fixed ports further comprises an arcuate obround-shaped recess aligned along the respective inner and outer concentric circles with each recess having a width corresponding to the diameter of each fixed port and having a length such that the space between each equidistant recess from an adjacent recess is approximately less than or equal to the cross-sectional area of each fixed port;

wherein said side surface having a plurality of upper circumferential contact ports, spaced radially equidistant from one another and radially aligned in accordance with the radial alignment of said second fixed ports such that each upper contact port is connected via an internal channel to the radially adjacent second fixed port;

wherein said side surface having a plurality of lower circumferential contact ports, also spaced radially equidistant from one another and also radially aligned in accordance with the radial alignment of said first fixed ports on said sealing base such that each lower contact port on said side surface is connected via an internal channel to the radially adjacent first fixed port on said sealing base;

wherein each connected upper contact port and it corresponding second fixed port provides a first process flow pair, and wherein each connected lower contact port and its corresponding first port provides a second process flow pair, such that the number of first process flow pairs is equal to the number of second process flow pairs and is also equal to number of chambers such that each process flow pair is connected to either a preselected chamber or has a preselected fluid stream in accordance with a predetermined process such that multiple fluid streams are directed into and out of the fluid-solid contacting chambers.

4. The multiport valve of claim 3 wherein each outer fixed port and its corresponding recess is located at a same outer point along the length of its corresponding recess and wherein each inner fixed port and its corresponding recess is located at a same inner point along the length of its corresponding recess.

5. A multiport valve apparatus for purifying, treating and separating fluids by directing multiple fluid streams into and out of a fluid-solid contacting apparatus having a plurality of fluid-solid contacting chambers, said multiport valve comprising:

a rotating cylindrical-shaped head having a circular-shaped sealing base, a circular-shaped fastening base with an axis of rotation therethrough the center of said bases and a cylinder side surface connecting said bases, with said bases having a radius, said sealing base having an inner concentric circle with a radius that is substantially less than said sealing base radius and said sealing base having an outer concentric circle with a radius that is greater than said inner circle radius but less than said sealing base radius;

wherein said sealing base further comprising a plurality of first rotating ports centered on the outer concentric circle, spaced radially equidistant from one another and further comprising a plurality of second rotating ports centered on said inner concentric circle also spaced radially equidistant from one another, wherein the plurality of first rotating ports and the plurality of second rotating ports are equal to one another in number;

wherein each first rotating port is connected to its corresponding second rotating port via a transverse channel to provide a rotating flow pair;

wherein each of said rotating ports has a diameter wherein each of said rotating ports further comprises an arcuate obround-shaped recess aligned along the respective inner and outer concentric circles with each recess having a width corresponding to the diameter of each rotating port and having a length such that the space between each equidistant recess from an adjacent recess is approximately less than or equal to the cross-sectional area of each rotating port;

wherein each flow pair are connected in the following manner:

starting with any first rotating port and then connecting that first rotating port to the nearest radially adjacent second rotating port via a transverse channel to form the first rotating flow pair, then connecting the next immediately radially adjacent clockwise first rotating port from said starting first rotating port to the nearest immediately radially adjacent counterclockwise second rotating port from said starting second rotating port via a transverse channel to form the second rotating flow pair, and so on until each first rotating port is connected to a second rotating port and wherein the number of rotating flow pairs corresponds to the number of chambers;

wherein upon rotation of said valve, each of said rotating flow pairs can be sequenced to connect to said plurality of fluid-solid contacting chambers to direct fluid streams into and out of said fluid-contacting chambers;

a fixed cylindrical-shaped head having a circular-shaped sealing base, a circular-shaped fastening base with a central axis therethrough the center of said bases and a side surface connecting said bases, with said bases having a radius, said sealing base having an inner concentric circle with a radius that is substantially less than said sealing base radius and said sealing base having an outer concentric circle with a radius that is greater than said inner circle radius but less than said sealing base radius;

said sealing base further comprising a plurality of first fixed ports centered on said outer concentric circle, spaced radially equidistant from one another and a plurality of second fixed ports centered on said inner concentric circle also spaced radially equidistant from one another, wherein the plurality of first fixed ports and second fixed ports are equal to one another in number;

wherein said side surface having a plurality of upper circumferential contact ports, spaced radially equidistant from one another and radially aligned in accordance with the radial alignment of said second fixed ports such that each upper contact port is connected via an internal channel to the radially adjacent second fixed port and;

wherein said side surface having a plurality of lower circumferential contact ports, also spaced radially equidistant from one another and also radially aligned in accordance with the radial alignment of said first fixed ports on said sealing base such that each lower contact port on said side surface is connected via an internal channel to the radially adjacent first fixed port on said sealing base and;

wherein each connected upper contact port and it corresponding second fixed port provides a first process flow pair, and wherein each connected lower contact port and its corresponding first port provides a second process flow pair, such that the number of first process flow pairs is equal to the number of second process flow pairs and is also equal to number of chambers such that each process flow pair is connected to a either a preselected chamber or has a preselected fluid stream in accordance with a predetermined process such that multiple fluid streams are directed into and out of the fluid-solid contacting chambers;

sealing means attached to said fastening base of said fixed head and the fastening base of said rotating head such that the respective sealing bases are urged against one another and aligning said bases such that the central axis of said fixed base is coincident with the rotation axis of said rotational base and such that the plurality of first fixed ports lines up with plurality of first rotating ports and such that the plurality of second fixed ports lines up with the plurality of second rotating ports;

drive means for rotating and indexing said rotating head on its axis of rotation so that fluid streams flowing through said multiport valve to the chambers can be directed into and out of the fluid-solid contacting chambers.

6. The multiport valve of claim 5 wherein each outer rotating port and its corresponding recess is located at a same outer point along the length of its corresponding recess and wherein each inner rotating port and its corresponding recess is located at a same inner point along the length of its corresponding recess.

7. The multiport valve of claim 5 further comprising a second fixed head and a second rotational head such that each rotational head is adjacent to one another and aligned such that their respective axis of rotation are coincident with one another and such that each rotating head is indexed in concert with one another so that proper fluid flows are maintained.

* * * * *